United States Patent [19]

Agranat et al.

[11] Patent Number: 5,519,833
[45] Date of Patent: May 21, 1996

[54] DISTRIBUTED DATA PROCESSING SYSTEM PROVIDING A DISTRIBUTED STREAM SOFTWARE ENVIRONMENT TO ENABLE APPLICATION ON A FIRST SYSTEM TO USE DRIVER ON A SECOND SYSTEM

[75] Inventors: Ian Agranat, Weston; Karl E. Zimmerman, Hopedale, both of Mass.

[73] Assignee: Computervision Corporation, Bedford, Mass.

[21] Appl. No.: 929,798

[22] Filed: Aug. 13, 1992

[51] Int. Cl.$^6$ .................................................. G06F 13/00
[52] U.S. Cl. .................. 395/200.03; 395/200.09; 395/827; 395/840; 395/700; 395/800; 364/228.8; 364/DIG. 1
[58] Field of Search ................................. 395/325, 700, 395/600, 650, 800, 200, 650

[56] References Cited

U.S. PATENT DOCUMENTS

| | | | |
|---|---|---|---|
| 4,887,204 | 12/1989 | Johnson et al. | 364/200 |
| 4,949,254 | 8/1990 | Shorter | 364/200 |
| 5,060,150 | 10/1991 | Simor | 395/325 |
| 5,062,037 | 10/1991 | Shorter et al. | 364/200 |
| 5,063,500 | 11/1991 | Shorter | 395/200 |
| 5,163,156 | 11/1992 | Leung et al. | 395/800 |
| 5,201,049 | 4/1993 | Shorter | 395/650 |
| 5,237,693 | 8/1993 | Kiyohara et al. | 395/725 |
| 5,291,597 | 3/1994 | Shorter et al. | 395/650 |
| 5,327,559 | 7/1994 | Priven et al. | 395/700 |
| 5,335,347 | 8/1994 | Foss et al. | 395/650 |

*Primary Examiner*—Thomas C. Lee
*Assistant Examiner*—Le Hien Luu
*Attorney, Agent, or Firm*—Wolf, Greenfield & Sacks

[57] ABSTRACT

A distributed data processing system includes at least a first data processing system and a second data processing system. The first data processing system includes an application that is connected by a full duplex data transfer path to a transport provider service. Transport provider service couples the first data processing system with the second data processing system. The second data processing system has a similar transport service provider. This transport service provider is coupled to a full duplex data transfer path. A full duplex data transfer path to a remote driver may be opened by the application of the first data processing system. This application may also cause various modules to be pushed on to this data transfer path.

18 Claims, 31 Drawing Sheets

DISTRIBUTED DATA PROCESSING SYSTEM PROVIDING A DISTRIBUTED STREAM SOFTWARE ENVIRONMENT TO ENABLE APPLICATION ON A FIRST SYSTEM TO USE DRIVER ON A SECOND SYSTEM

FIELD OF THE INVENTION

The present invention relates generally to a distributed software environment and, more particularly, to a distributed software environment for providing communication services.

BACKGROUND OF THE INVENTION

STREAMS is a software environment developed by American Telephone and Telegraph Company for use with the "UNIX" operating system ("UNIX" is a registered trademark of UNIX System Laboratories, Inc.). STREAMS has been incorporated into recent versions of "UNIX" and is a standardized part of "UNIX" System V, Release 4. STREAMS provides developers with functions, utility routines and facilities that assist in software design and development. The STREAMS mechanism provides a standardized means for gaining access to "UNIX" system communication services.

Central to understanding STREAMS is the notion of a "stream". A "stream" is a full duplex data transfer path between a user process and a driver in the kernel space of the "UNIX" operating system. The kernel space of "UNIX" is the portion of the operating system that interacts with hardware to provide a set of services that can be utilized by user programs. The "UNIX" operating system also includes a shell, for reading and interpreting commands.

FIG. 1 provides an illustration of the data flow in an example stream 21. The stream 21 provides a full duplex data transfer path between a user process 24 residing within a user space 20 and a driver 30 residing within a kernel space 22. The kernel space 22 is a privileged area that user programs may not access except through system calls. The driver 30 is connected to at least one peripheral device through an external interface 32. The stream 21, thus, facilitates a data path between the user process 24 and at least one peripheral device.

Each stream 21 includes a stream head 26 situated at the end of the stream that is nearest to the user process 24. The stream head 26 processes system calls made by the user process 24 to convert the system calls into appropriately formatted messages that are sent down the stream 21. In general, a user may gain access to facilities provided by the software environment through STREAMS-specific system calls. These system call include the open(2) system call that recognizes a STREAMS file and creates a stream to a specific driver. Other system call include the read(2) and write(2) system calls which receive and send data on a stream. The close(2) system call dismantles a stream, and the ioctl(2) system call enables a user to perform functions specific to a particular device. Lastly, the putmsg(2) and getmsg(2) system calls enable a user to send and receive STREAMS messages, respectively.

As mentioned above, the stream 21 also includes driver 30. Driver 30 may be either a device driver for driving at least one peripheral input/output (I/O) device or a software driver (known as a pseudo-device driver) that does not drive a hardware device but, instead, interprets messages. The driver 30 typically handles data transfer between the kernel and the peripheral devices that are coupled to it through the external interface 32, but performs little processing of data other than conversion between data structures used by the STREAMS mechanism and data structures used by the coupled devices.

A stream may also include one or more modules, such as module 28 in stream 21. Modules are added and removed from a stream by system calls. In particular, the ioctl I_PUSH system call adds a module to a stream beneath the stream head 26, and the ioctl I_POP system call removes the module closest to the stream head from the stream. The pop of the module calls the "close" procedure of the module.

Module 28 processes data flowing on the stream 21 by performing intermediate transformations on messages that pass between the stream head 26 and the driver 30. The module 28 is a defined set of kernel-level routines and data structures used to process data, status information, and control information. Each module in a stream is self-contained and functionally isolated.

Data is passed between the driver 30 and stream head 26 in the form of messages. These messages are passed by making calls to the putmsg or getmsg system call. Messages that are passed from the stream head 26 to the driver 30 are referred to as "downstream" messages. On the other hand, messages that are passed from the driver 30 to the stream head 26 are referred to as "upstream" messages. In STREAMS, a message is a set of data structures used to pass data, status information and control information. Each STREAMS message includes at least one message block. A message block is a 3-tuple comprising a header, a data block and a data buffer.

Messages are held at different stages of the stream 21 by queues. The queues serve as interfaces, between drivers or modules and the rest of the stream 21. Queues are allocated in pairs: an upstream queue that receives messages being sent upstream and a downstream queue that receives messages being sent downstream. For instance as shown in FIG. 2, module 36 includes upstream queue 42u and downstream queue 42d, and module 38 includes upstream queue 44u and downstream queue 44d. Driver 40 also includes an upstream queue 47u and a downstream queue 47d.

The queues 42u, 42d, 44u, 44d, 47u and 47d temporarily hold messages as the messages are passed up and down the stream 21. Often times, a queue may hold more than one message at a time. In such instances, as shown in FIG. 3, the first message in the queue (denoted as "message 1") includes a pointer 51 to the next message in the queue (i.e., message "2") and a pointer 53 to the queue header 49. The queue header 49 is a header positioned at the beginning of the linked list of the queue. The message blocks 46 that form "message 1" are linter-connected to form a linked list. Similarly, the message blocks 48 that form "message 2" are connected in a linked list.

A stream is constructed as a linked list of kernel resident data structures. Specifically, the linked list is created as a set of linked queue pairs. Kernel routines interface with the stream head to perform operations on the stream. Each queue includes an "entry point" which points to a procedure that processes messages received by the respective queue.

In the illustrated stream 21 of FIG. 1, the stream is a linear connection to modules, wherein each instance of a module is connected to at most one upstream module and at most one downstream module. While this configuration is suitable in many instances, certain applications require the ability to multiplex multiple streams in a variety of configurations. Therefore, the STREAMS software environment provides a multiplexer structure that multiplexes upper streams (streams that are upstream from the multiplexer) with lower streams (streams that are downstream from the multiplexer).

More information regarding the STREAMS environment is provided in the "UNIX System V, Release 4.0 STREAMS Guide", 1990, American Telephone and Telegraph Company.

One problem with the STREAMS environment is that it cannot be used in a distributed fashion. In other words, a system may not access drivers resident on another system.

It is, therefore, an object of the present invention to provide a distributed software environment for development of system communication services.

SUMMARY OF THE INVENTION

The foregoing objects are realized by the present invention wherein a distributed data processing system includes a first data processing system that runs an operating system. The first data processing system has an application that runs on the operating system. The distributed system also includes a second data processing system that has no shared memory path with the first data processing system. The second data processing system also runs an operating system. This operating system may be the same or different from the operating system run on the first data processing system.

The distributed system provides a physical interconnection between the first and second data processing systems to enable communications between the systems. The distributed data processing system also includes a software interface for enabling the application on the first system to use the first driver on the second system through the physical interconnection.

The distributed data processing system preferably further includes a module on the second data processing system for processing communications to and from the first driver. Preferably, this module is pushed onto a full duplex data transfer path provided between the application and the first driver. The first driver may be used to drive a peripheral device that is part of the second data processing system.

The software interface may provide a full duplex data transfer path in the first data processing system between the application and a second driver resident in a kernel of the operating system. This second driver interfaces with the physical interconnection. Likewise, the second data processing system may include a full duplex data transfer path between the first driver and a third driver that interfaces with the physical interconnection. This physical interconnection may be realized in many forms including a local area network.

Once the software interface is in place, messages may be transferred from the application in the first data processing system to the driver and other elements in the second data processing system. The passing of these messages enable the opening and closing of the first driver as well as the popping and pushing of modules onto the data transfer path leading to the first module.

BRIEF DESCRIPTION OF THE DRAWINGS

The present invention will be described in more detail hereinafter with reference to the drawings in which.

DETAILED DESCRIPTION OF THE PREFERRED EMBODIMENT

The present invention provides a software environment that allows an operating system to build streams using drivers and modules residing on another participating system that runs a separate copy of an operating system. The two systems are able to communicate over a conventional network connection. This software environment enables one system to open drivers or push modules on another system. In fact more than two systems may be interconnected by the software environment.

The software environment is implemented as a distributed software package that is installable on an operating system such as "UNIX" System V, Release 4. The modules and drivers that are part of the software environment conform to the System V, Release 4 requirements. The preferred embodiment is implemented as an embellishment to the STREAMS software environment.

The preferred embodiment of the present invention provides a capability for passing messages from a first system to a second system. In this fashion, the first system is able to communicate with drivers and modules of the second system. The preferred embodiment of the present invention also provides for management of events in a distributed setting. These events include opening and closing a stream, as well as pushing and popping a module. In a non-distributed system, these events are handled by subroutine calls. However, in the distributed environment, messages are passed between systems to manage these events. The discussion that follows will describe functionally how these managerial events are handled.

The software of the present invention provides special modules not available in the conventional STREAMS environment. These special modules enable a distributed implementation of STREAMS. Each of these special modules are described in more detail below.

Figure 1:
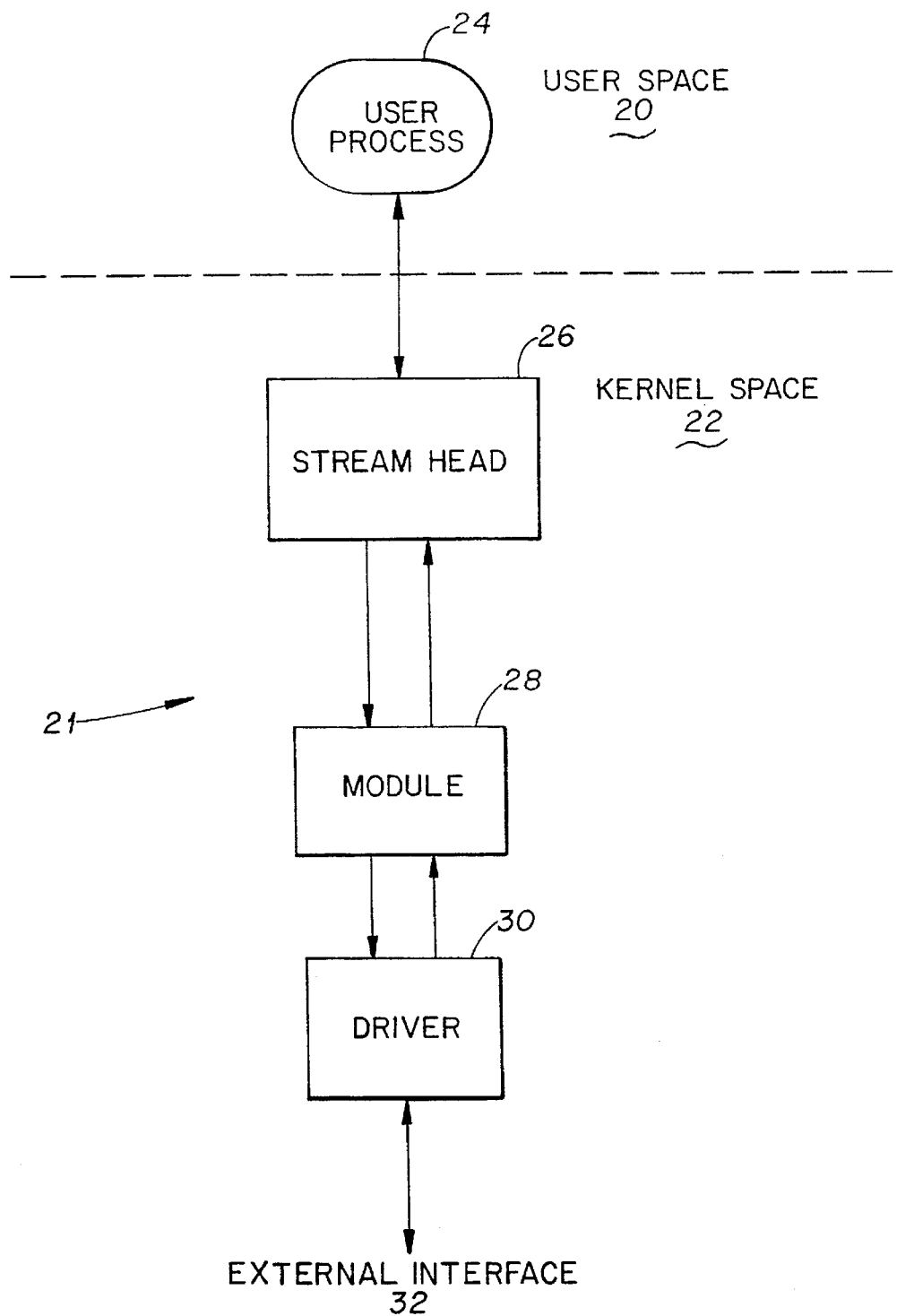
FIG. 1 shows a conventional stream provided by the STREAMS mechanism.
Figure 2:
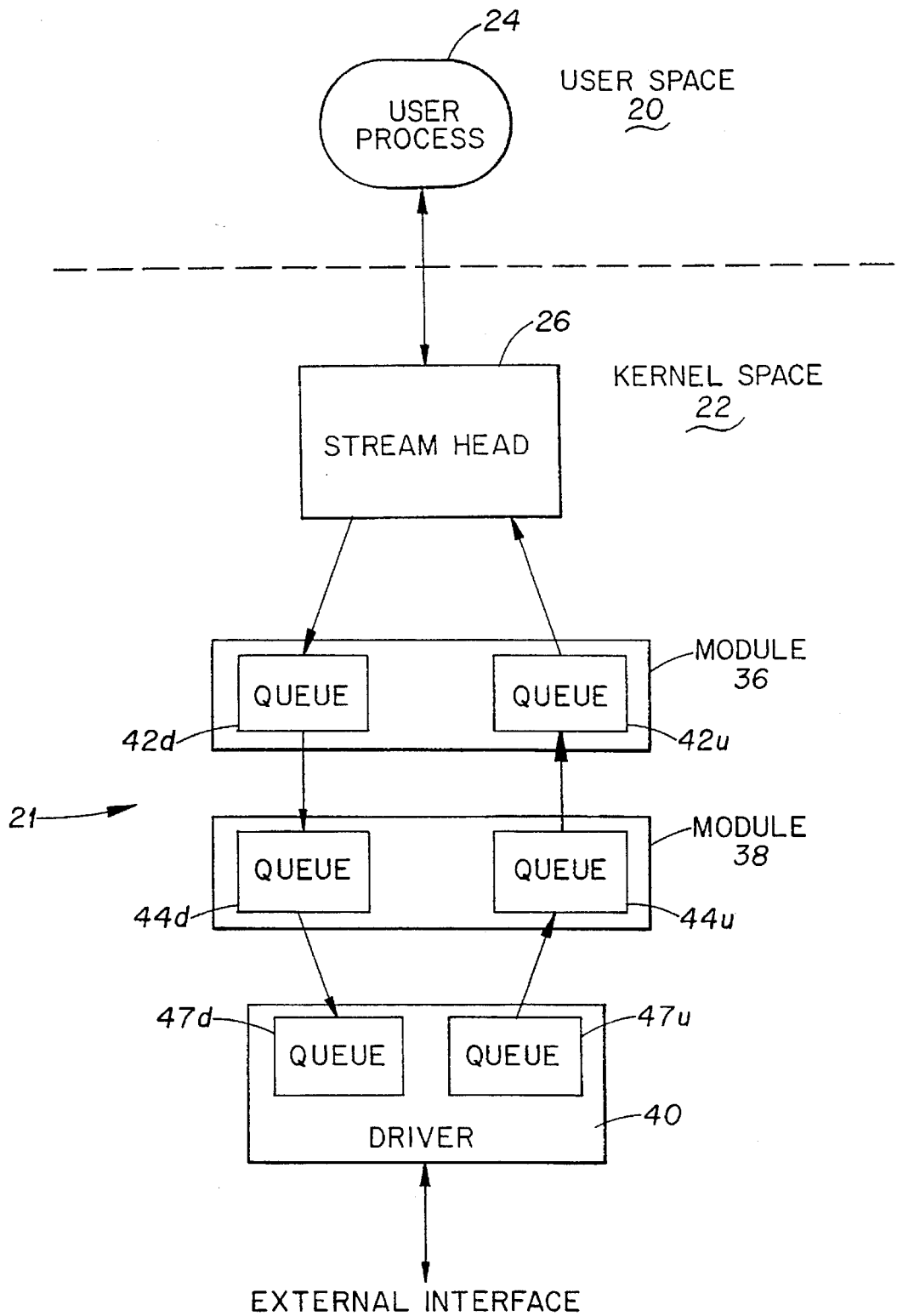
FIG. 2 is a depiction of the stream of FIG. 1 illustrating the queues that are employed in the stream.
Figure 3:
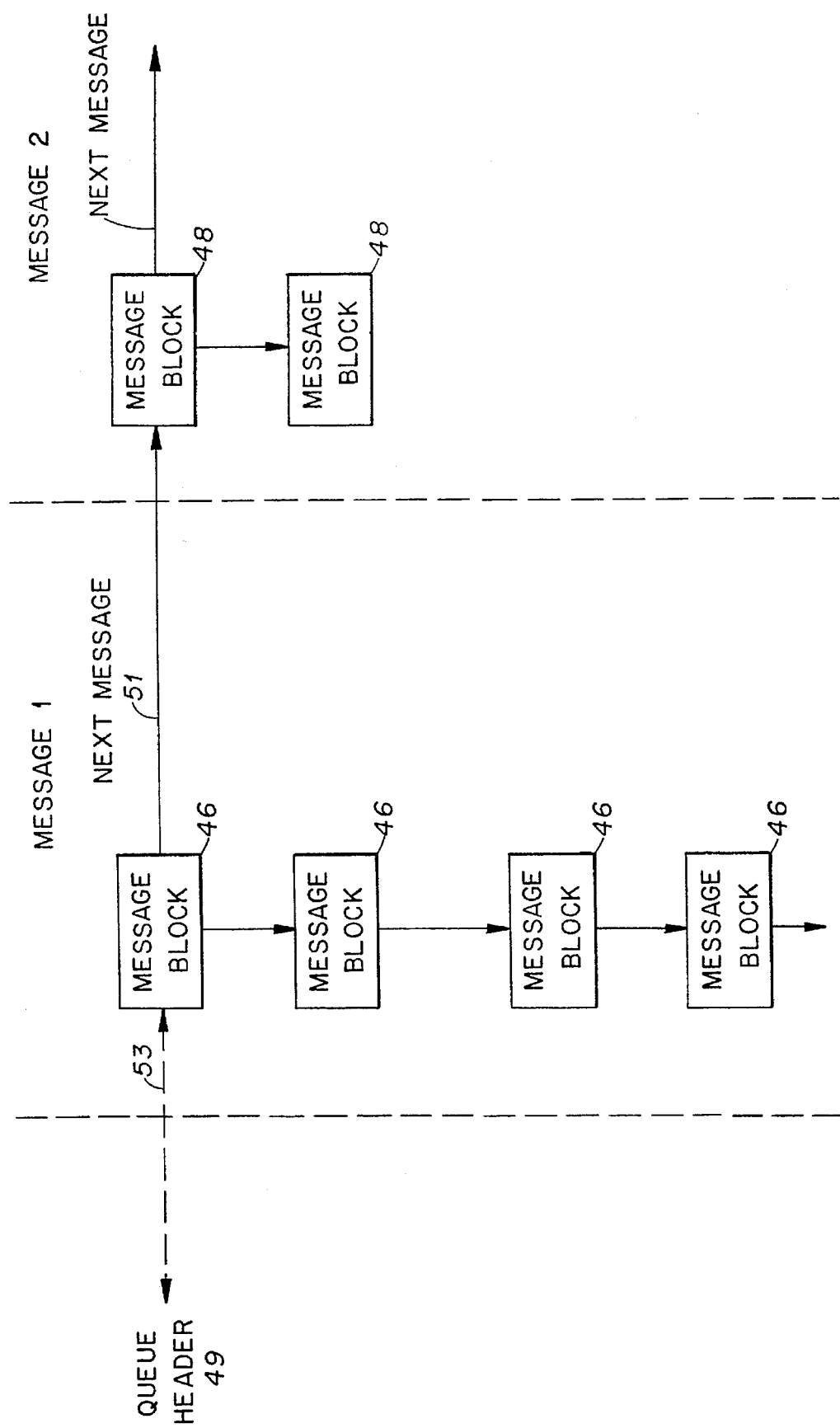
FIG. 3 is an illustration of messages that are held within a queue.
Figure 4A:
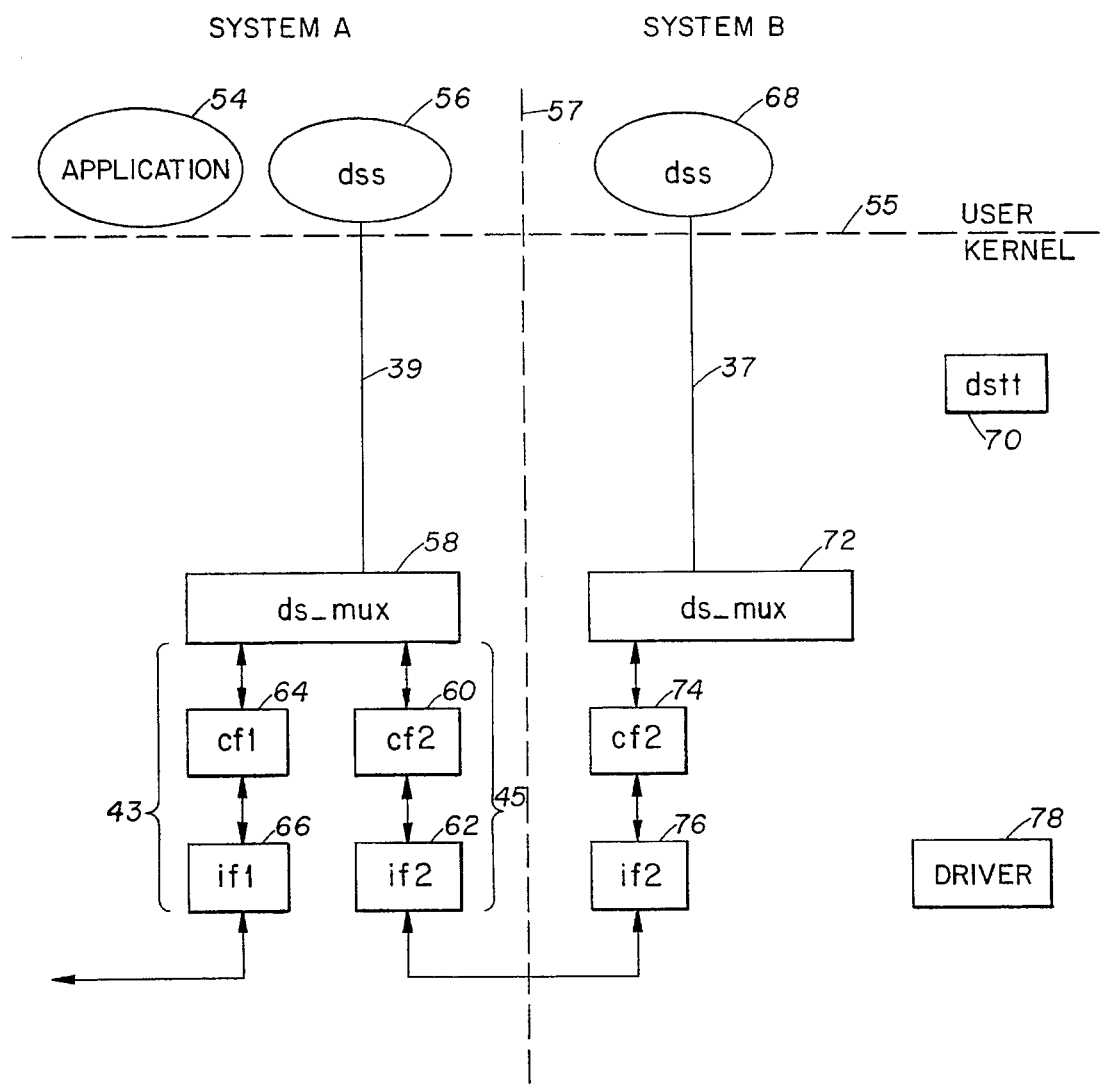
FIGS. 4a–4g illustrate steps in opening a remote driver.

The preferred embodiment enables a first system to open a driver on a second system. In order to understand how the first system may open a driver on the second system, it is helpful to consider an example. FIG. 4a shows an example wherein two data processing systems (system A and system B) are both running the "UNIX" operating system, and streams already exist on these systems. These streams were created in conventional fashion.

Before an application may gain access to a remote driver, a connection must be made to the remote system where the remote driver resides. This connection is realized through an access method program. The access method program performs three tasks. First, the access method program establishes a transport connection to a cooperating remote system. Second, the access method program pushes any required convergence function modules onto appropriate streams. Third, the access method program passes the connection to the STREAMS mechanism.

The arguments passed to the access method program include the name of the driver that will provide a transport service, the name of appropriate convergence function modules, a system address for the system that initiates the connection or a system address at which the responding system will accept the connection request.

The access method program is run during initialization of the distributed STREAMS server, which will be described below. In particular, each system maintains a text "systems" file. Each line of text in this file includes two fields. The first field provides a name of a remote system to which a connection is sought. The second field is a shell command for the operating system to execute the access method program. Once the access method program is run, it establishes the appropriate connection using transport service providers and convergence function modules as will be described below.

Suppose that system A wishes to open a stream leading to driver 78 that is present on system B. Boundary 55 is provided in FIG. 4a to separate the user space from the kernel space, and boundary 57 is provided to separate system A from system B. The user space of system A includes an application 54 and a distributed STREAMS server (dss) daemon 56. The dss 56 is a daemon that acts as a proxy for remote applications to open drivers. A daemon is a process provided in the "UNIX" operating system that performs useful work in the background. Each system must include a dss in order to facilitate distributed STREAMS. When the dss 56 is started, it opens a control stream 39 to a distributed STREAMS multiplexer (ds_mux) module 58. The control stream is used to pass control information.

The ds_mux 58 serves as a many-to-many multiplexing driver that provides access to remote drivers by sending appropriate control messages to the remote systems and by multiplexing "upper" streams onto lower transport connections (such as 62 and 76). Each system must include a ds_mux to support distributed STREAMS.

Two lower streams 43 and 45 (i.e. streams below ds₁₃ mux) are connected to the ds mux 58. Lower stream 43 includes a convergence function module (cf1) 64 that is connected to a transport service provider module (denoted as if1) 66. The convergence function module 64 serves to place STREAMS messages in an appropriate format so the messages may be transferred over the transport connection leading to system B. The transport connection is provided by a driver known as a transport service provider 62, which may be realized as networking software or other suitable interfacing software that provides reliable communication across the network or information that extends between system A and system B. The other lower stream 45 of the ds_mux 58 includes a similar convergence function module (cf2) 60 and transport service provider (if2) 62 that provide a connection to another system (not shown). As discussed above, the connections between the systems are realized during initialization of dss.

The transport service provider 62 of lower stream 45 of the ds_mux 58 interfaces with a compatible transport service provider (if2) 76 provided within system B. Transport service provider 76 is like the corresponding driver 62 in system A. Transport service provider 76 is connected by a full duplex connection to a stream that has function module (cf2) 74 on it. The convergence function module 74 serves to receive and transmit messages across the transport connection provided by the driver 76. The convergence function module 74 is, in turn, connected to ds_mux 72 in system B. The ds_mux 72 is connected to dss 68 provided in the user space of system B.

System B additionally includes the driver 78, in the kernel space, which system A wishes to open. In addition, the kernel space of system B includes a distributed STEAMS twist-tie (dstt) module 70. The dstt module 70 acts as a "loop-around" module to direct messages to driver 78, as will be described in more detail below.

Figure 5:
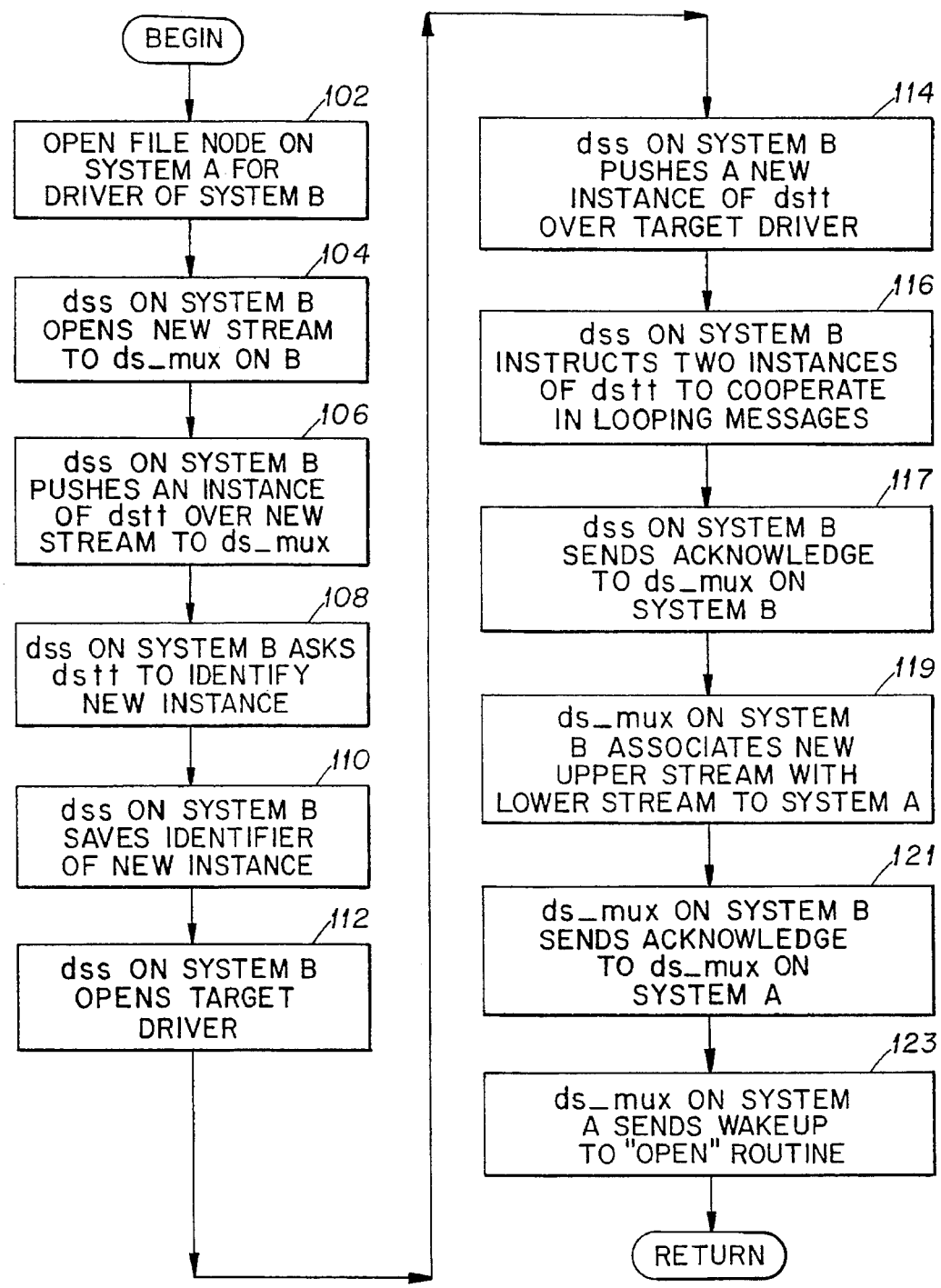
FIG. 5 is a flowchart of the steps involved in opening a remote driver.

FIG. 5 provides a flowchart of the steps involved in having application 54 open a stream leading to driver 78 (FIG. 4a) on system B. The first step in opening a stream to driver 78 is to open a file node on system A for the driver 78 of system B (step 102 in FIG. 5).

The "UNIX" operating system associates a file node with each peripheral device in a system. These file nodes are stored within a special directory known as "/dev". Each file includes a file type that indicates whether the file is associated with a device or is a textual file. Each device file has a device number associated with it that is used to identify a piece of code in the kernel that is used to manage the device. A major device number and a minor device number is associated with each device file. The major device number points to a particular driver for handling the device. The minor device number identifies a specific device to be driven by the driver that is identified by the major device number. For instance, the major device number may point to a driver and the minor device number may identify a particular device, such as a disk drive in an array of disk drives, that is driven by the driver. The major device numbers are assigned sequentially at initialization by initialization routines. The minor device numbers are designated by the developer of the driver that is identified to by a major device number.

When dss 56 and dss 68 are opened, they read the directory listing for each file node in the "/dev/ds". These dss 56 and 68 extract the system name, node name and major device number from the listing for each file node. The dss 56 and 68 then send this information to the corresponding ds_mux 58 and 72, respectively. The ds_mux 58 and 72 is then able to find the remote system name and node name from the major device number passed in an "open" call (as will be described below).

Figure 6:
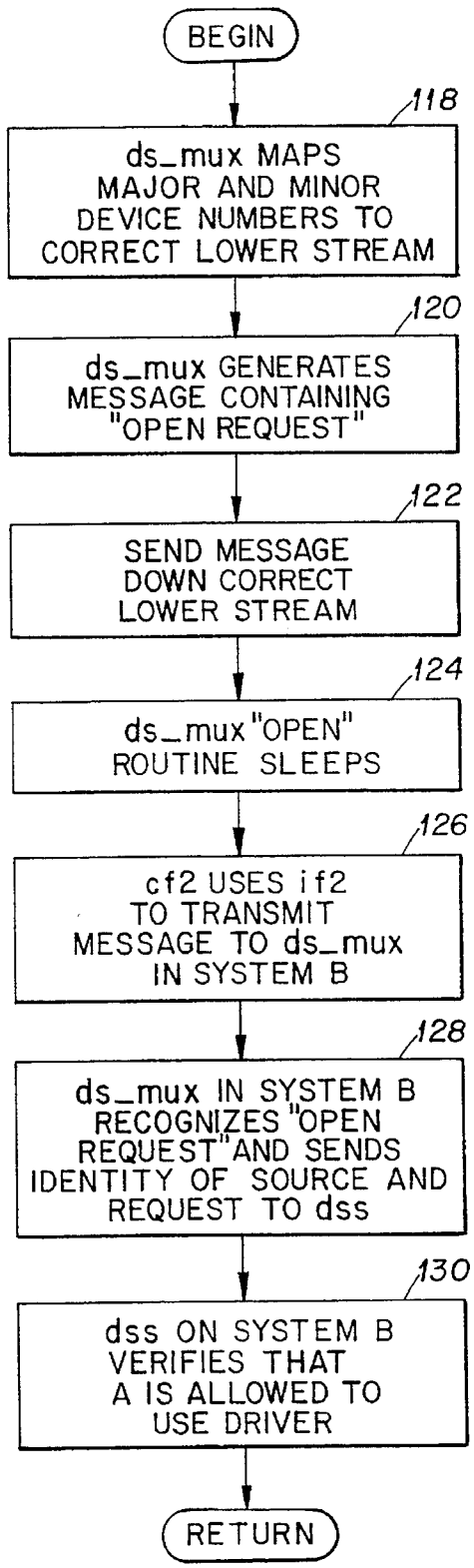
FIG. 6 is a flowchart of the steps involved in opening a file node for a remote driver on a system.

FIG. 6 shows a flowchart of the steps required to open the file node (step 102 in FIG. 5) on system A for the driver of system B. The steps shown in FIG. 6 will be described below with reference to FIG. 4b. When the file node on system A is opened, the major and minor device numbers of the file node are set to direct the "open request" to the ds_mux 58. This sending of the open request to the ds_mux 58 is represented by the connection 80 in FIG. 4b. An "open" procedure, executed by the ds_mux 58, maps the major and minor device numbers of the file node to the correct lower stream 45 and the correct file node name on system B (step 118 in FIG. 6). The ds_mux 58 (FIG. 4b) then generates a message containing a distributed STREAM "open request" (step 120 in FIG. 6) and sends this message downstream over lower stream 45 (FIG. 4b) towards system B (step 22 in FIG. 6). The "open" routine executed by the ds_mux 58 (FIG. 4b) then sleeps (step 124 in FIG. 6).

Figure 4B:
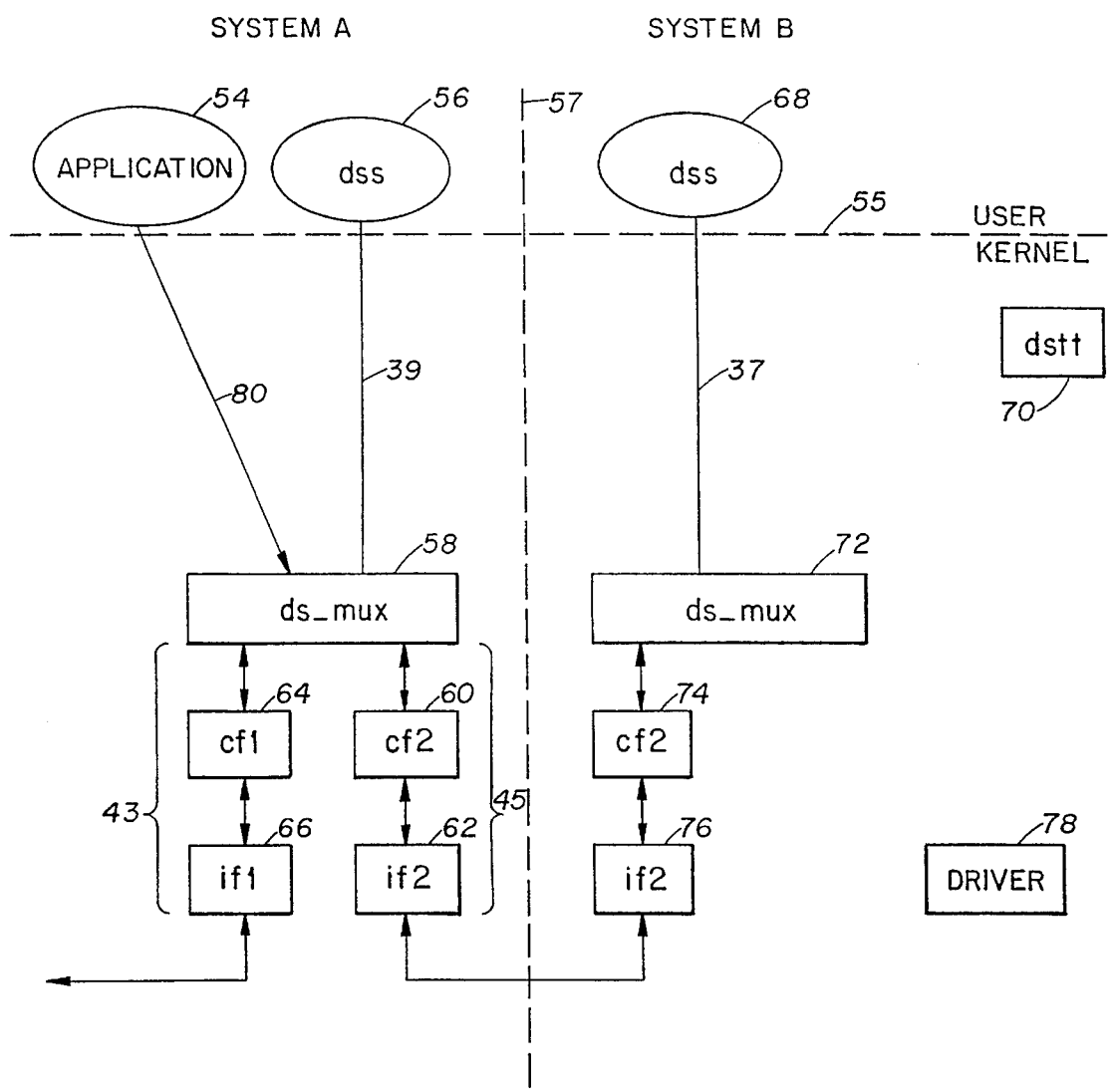

The convergence function module 60 uses the transport service provider 62 to transmit a message containing the "open request" to the ds_mux 72 in system B (step 126 in FIG. 6) as follows. The convergence function module 60 converts the message into a format required by the transport service provider 62 and conveys the revised message over a data stream provided by the transport service provider 62 (FIG. 4b). The conversion of the message to a form proper for the transport service provider may involve copying header information from data structures to data buffers, and translating constants. The convergence function module 60 preserves the starting point and ending point of the original message and preserves the type of each block within the original message. In addition, the convergence function module 60 preserves the length and content of data in each of the blocks of the message and preserves the offset of data from the start of the first block in a consecutive list of blocks in the message.

The revised message is then forwarded to transport service provider 62 on system A, which forwards the revised message to the transport service provider 76 on system B. The transport service provider 76 forwards the revised message to convergence function module 74, which converts the revised message back into a STREAMS message format. The STREAMS message is forwarded to ds_mux 72. The messages are received at the ds_mux 72 in conventional STREAMS format.

The ds_mux 72 in system B recognizes the "open request" in the revised message and sends the identity of the source of the message (i.e., system A) along with the request to the dss 68 (step 128 in FIG. 6). Lastly, dss 68 verifies that system A is allowed to use the designated driver 78 (step 130 in FIG. 6). Each system maintains a text file of other systems that may access nodes in the system. Verification is realized by accessing the text file to see if system A has access rights to driver 78. System B then knows that system A has opened a file node for the driver 78 (FIG. 4b).

Figure 4C:
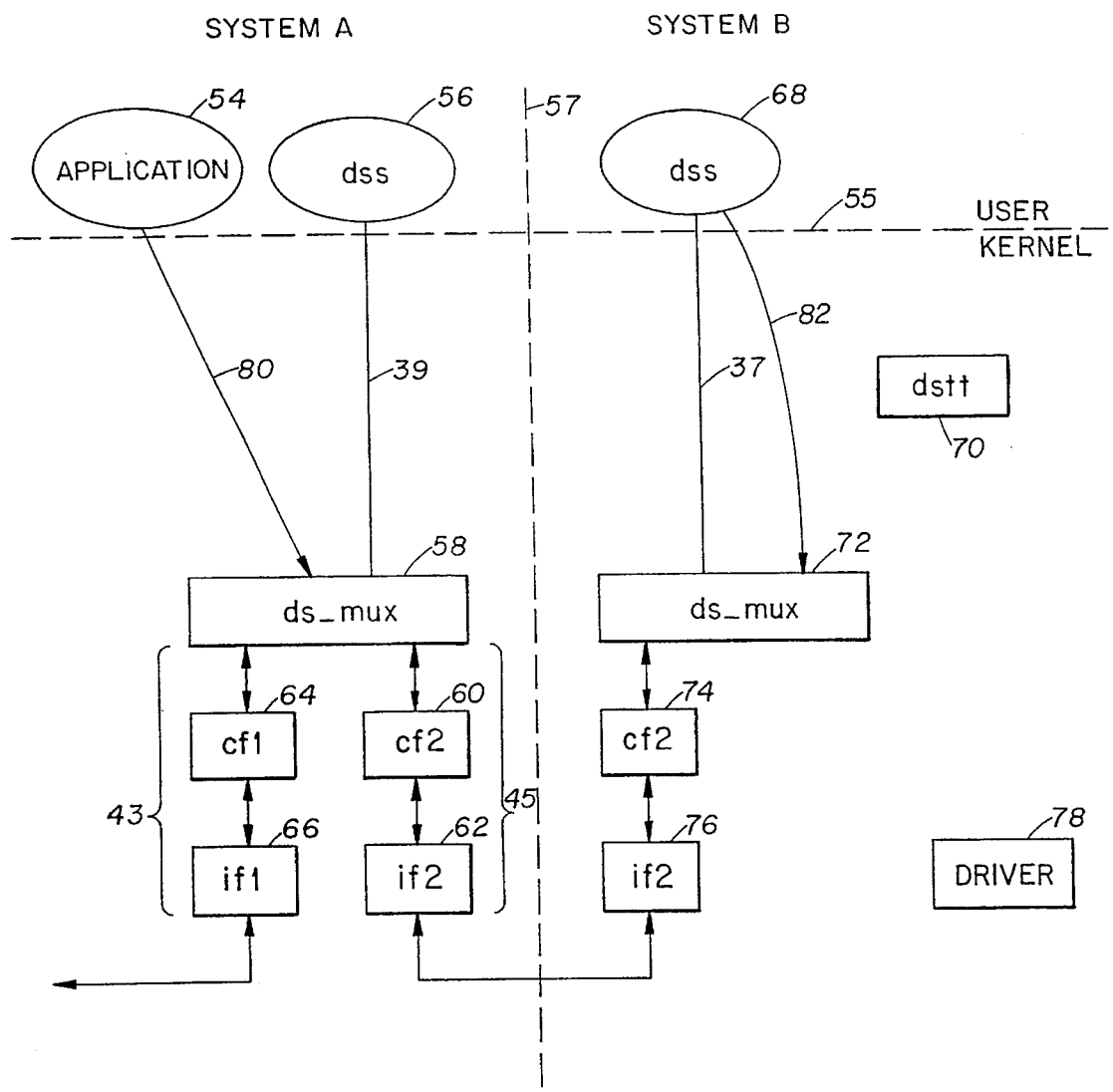
Figure 4D:
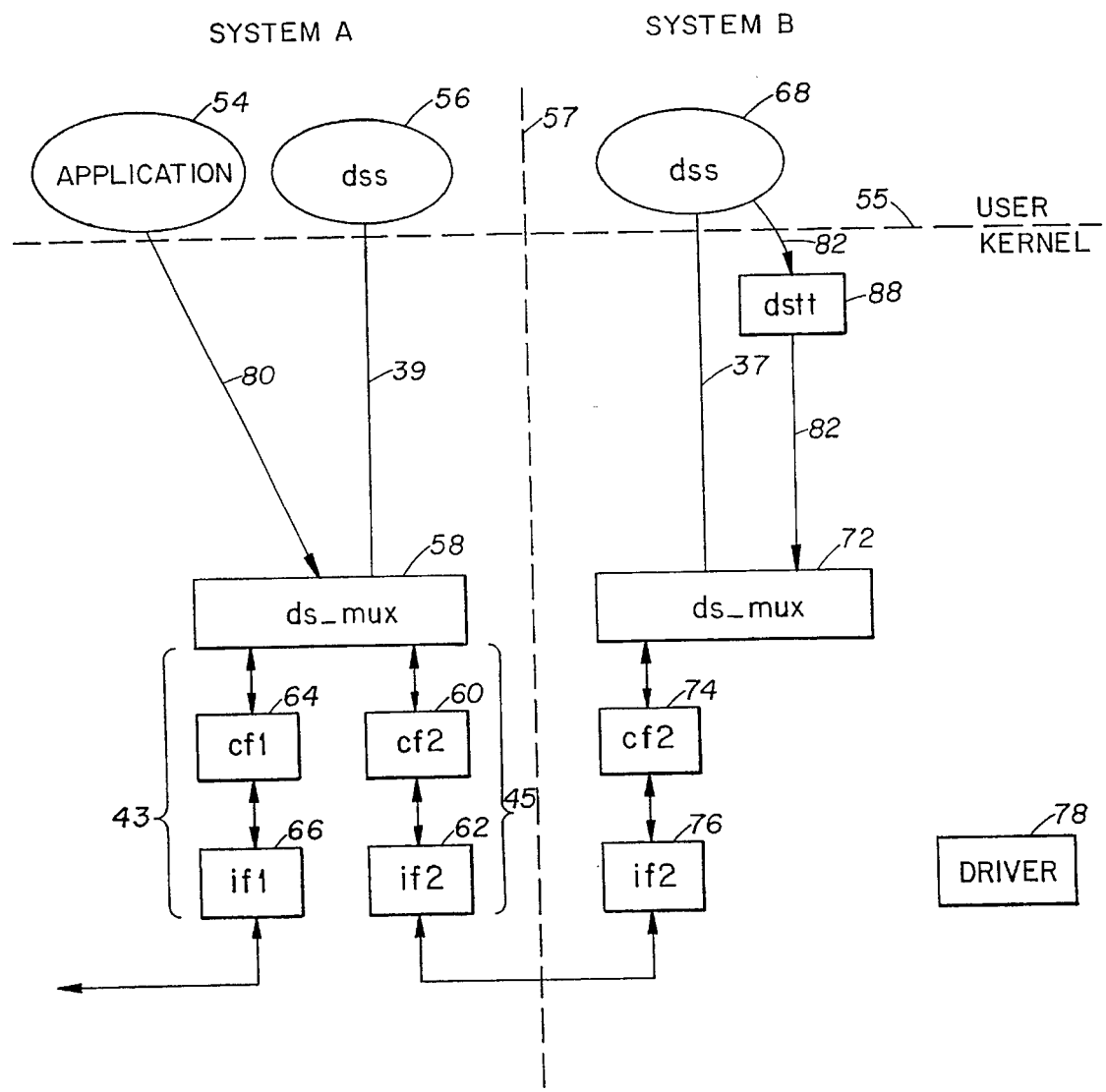

The distributed STEAMS server 68 (FIG. 4c) on system B then opens a new stream 82 to ds_mux 72 (step 104 in FIG. 5). Hence, control stream 37 and new stream 82 connect the distributed streams server 68 to ds_mux 72. Stream 82 (FIG. 4c) subsequently becomes the target stream for messages sent from the application 54 on system A to the driver 78. The dss 68 (FIG. 4d) on system B next pushes an instance 88 of a distributed STEAMS twist-tie (dstt) module over the new stream 82 leading to the ds_mux 72 (step 106 in FIG. 5) using I_PUSH ioctl. The dstt module acts as a loop-around module that directs messages sent upstream down a different stream (as will be described in more detail below). The dss 68 (FIG. 4d) asks the instance 88 of the dstt module to identify itself (step 108 in FIG. 5). The dss 68 (FIG. 4d), thus, obtains the identification of the new instance 88 of the dstt and saves the identifier (step 110 in FIG. 5).

Figure 4E:
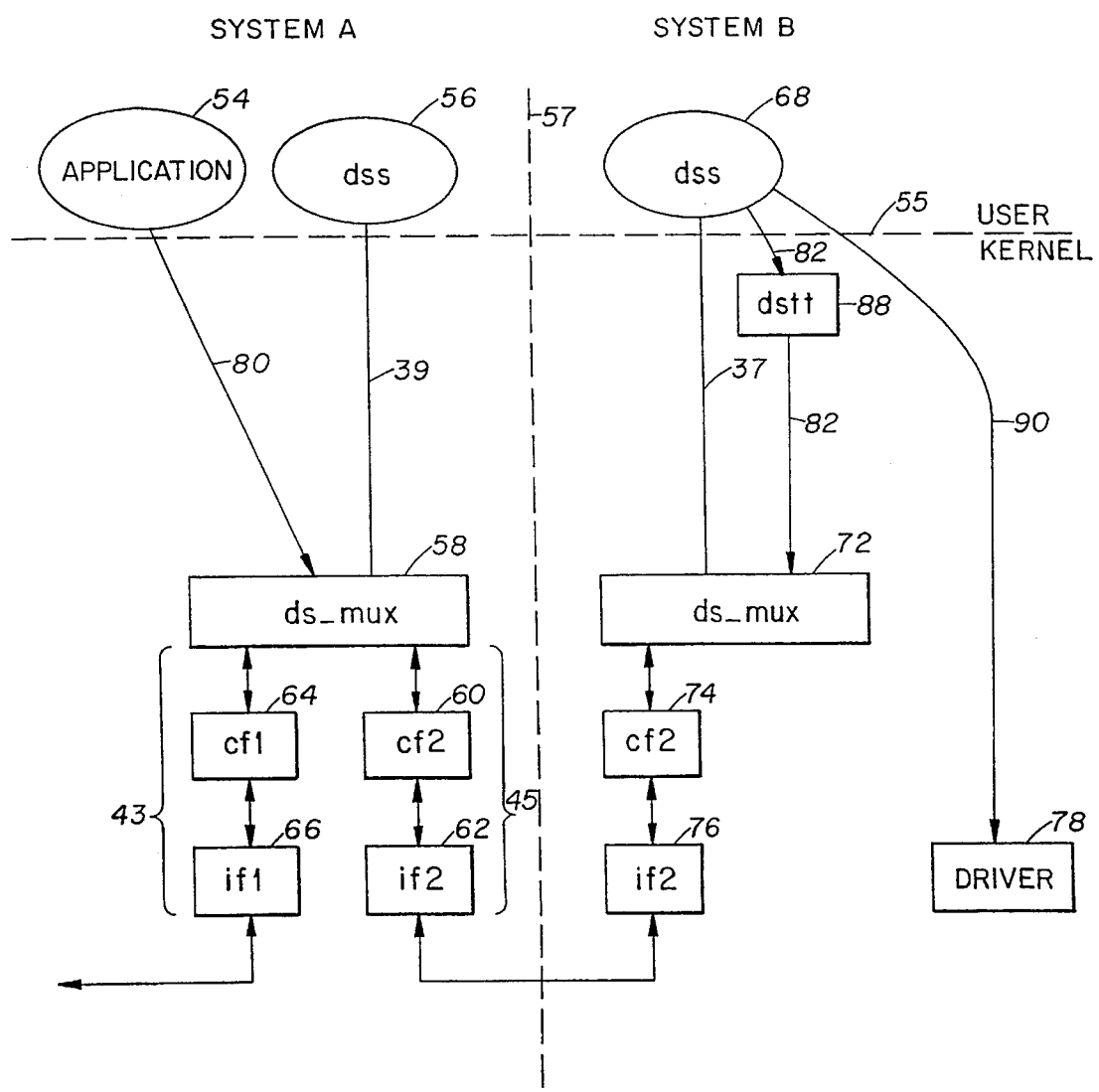
Figure 4F:
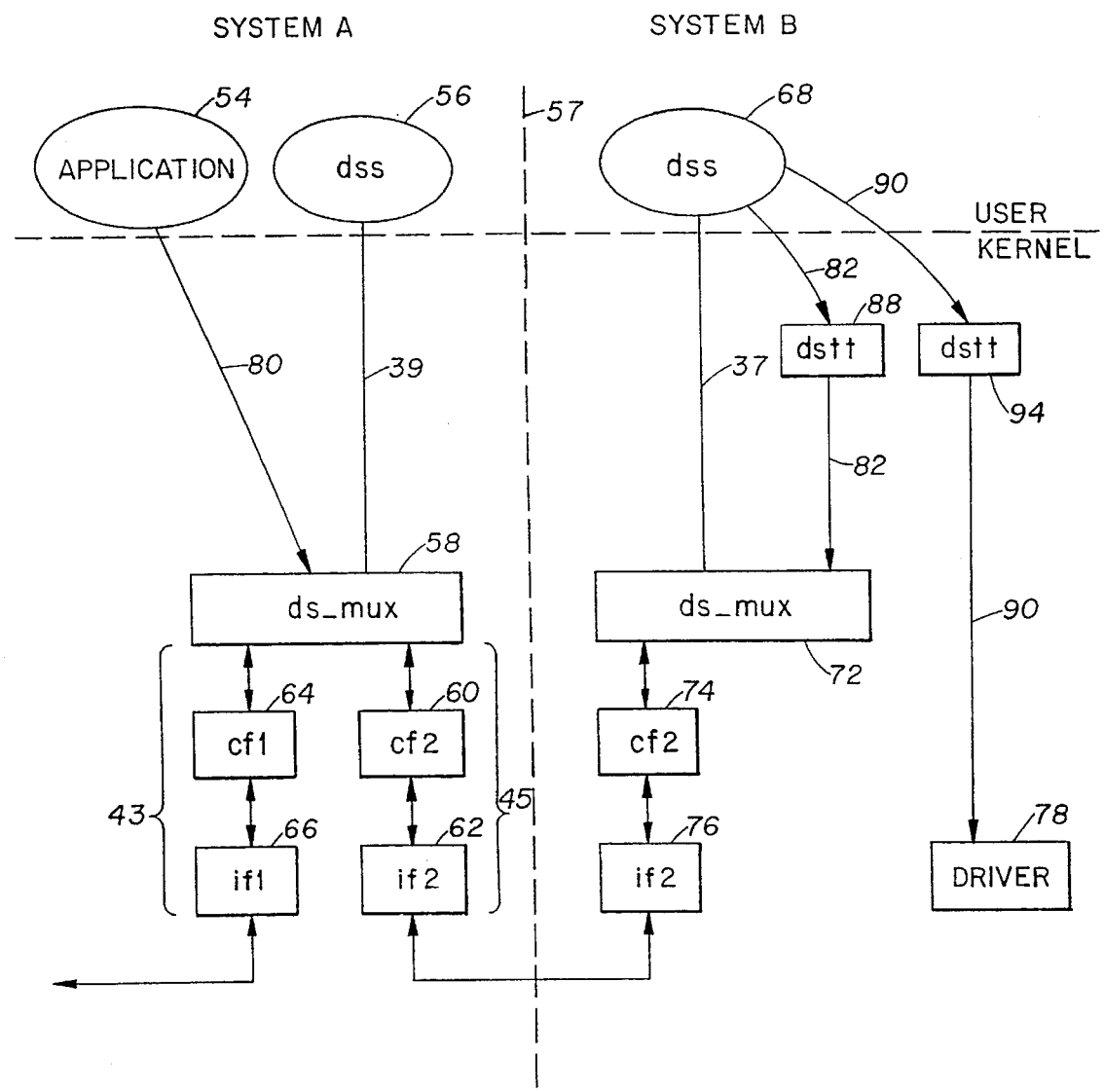

Having saved the identifier of the new instance 88 of the dstt (FIG. 4e), the dss 68 opens stream 90 leading to the target driver 78 (step 112 in FIG. 5). Once the stream 90 to the driver 78 (FIG. 4f) is opened, the distributed STREAMS server 68 pushes (using I_PUSH ioctl) a new instance 94 of dstt on stream 90 (step 114 in FIG. 5).

Figure 4G:
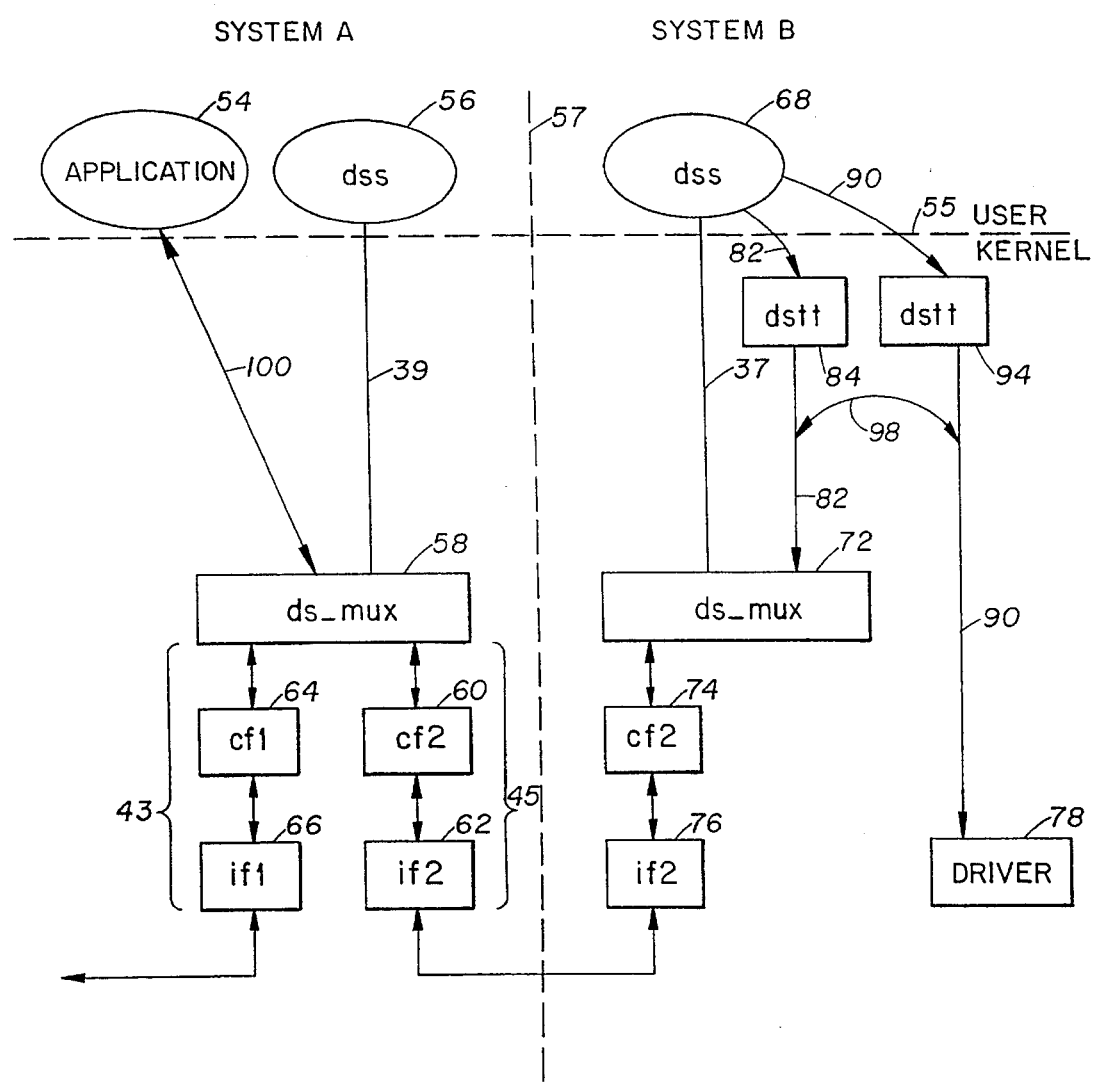

The dss 68 (FIG. 4g) instructs the two instances 84 and 94 of the dstt to operate in looping messages sent up one stream around to the downstream side of another stream (step 116 in FIG. 5). In particular, messages sent from the ds_mux 72 upstream 82 are looped around to stream 90 and down to the driver 78. This "loop-around" capability is illustrated in FIG. 4g by the connection 98. Hence, messages sent from system A to the ds_mux 72 are redirected to the driver 78 (and vice-versa).

The dss 68 (FIG. 4g) on system B then sends an "open acknowledge" message to the ds_mux module 72 (step 117) in FIG. 5. The ds_mux module 72 (FIG. 4g) associates the newly created upper stream with the lower stream leading to system A (step 119 in FIG. 5). In addition, the ds_mux module 72 (FIG. 4g) sends an "open acknowledge" message to the ds_mux 58 on system A (step 121 in FIG. 5). The ds_mux 58 (FIG. 4g) on system A then issues a wake-up call to the "open" routine so as to allow the routine application 54 to continue to operate (step 123 in FIG. 5).

Figure 7A:
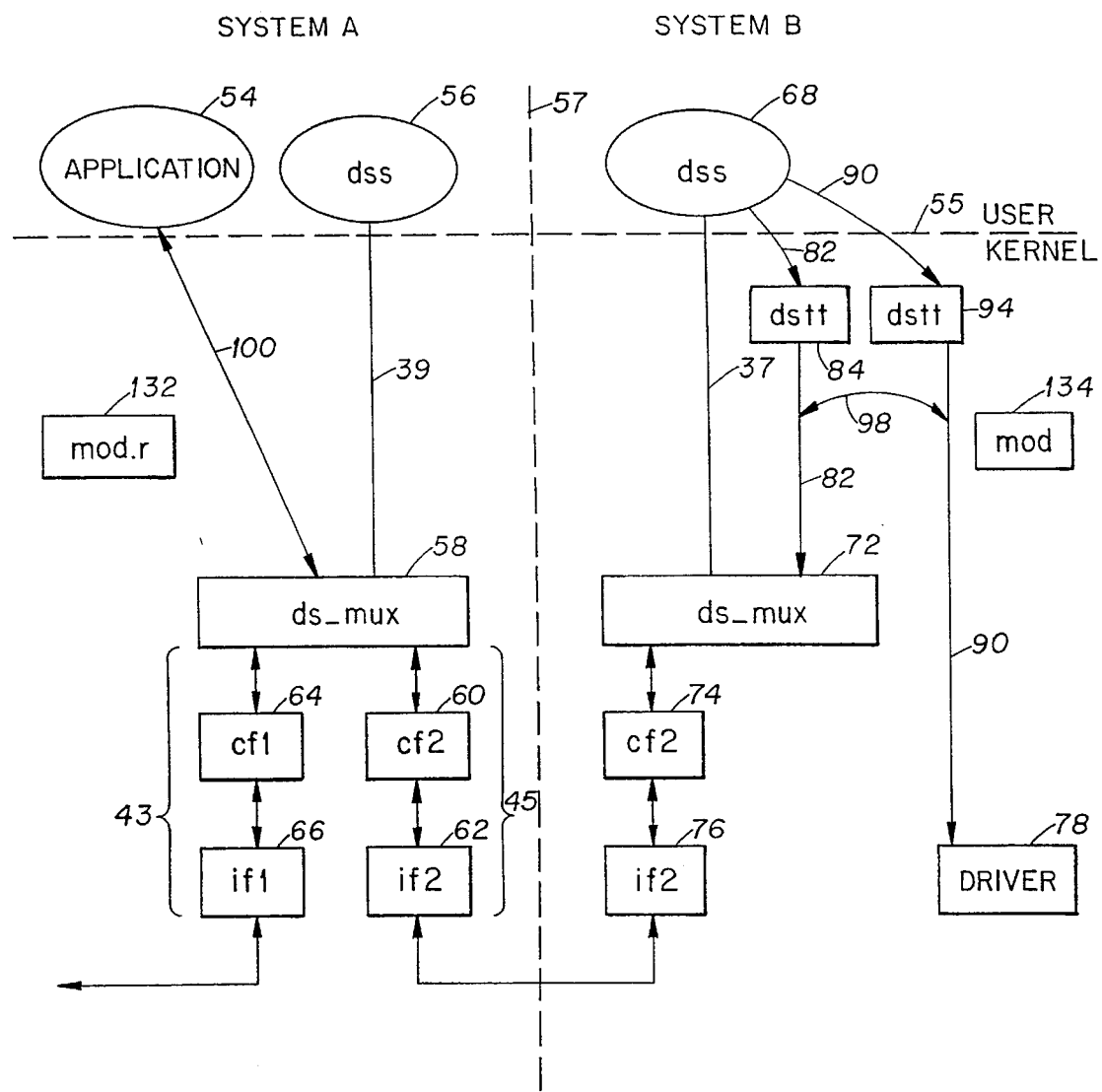
FIG. 7a–7f depict steps involved in pushing a module onto a stream leading to a remote driver.

Having opened a driver on system B, the application being run on system A may now wish to push a module onto the stream 90 (FIG. 7a) leading to the driver 78. FIG. 7a shows an example wherein the application 54 on system A wishes to push module 134 on the stream 90 leading to driver 78. In order to push such a module 134 over the driver 78 on system B, a shadow module "mod.r" 132 must be fully installed on system A, and, in addition, module 134 must be fully installed on system B.

Figure 7B:
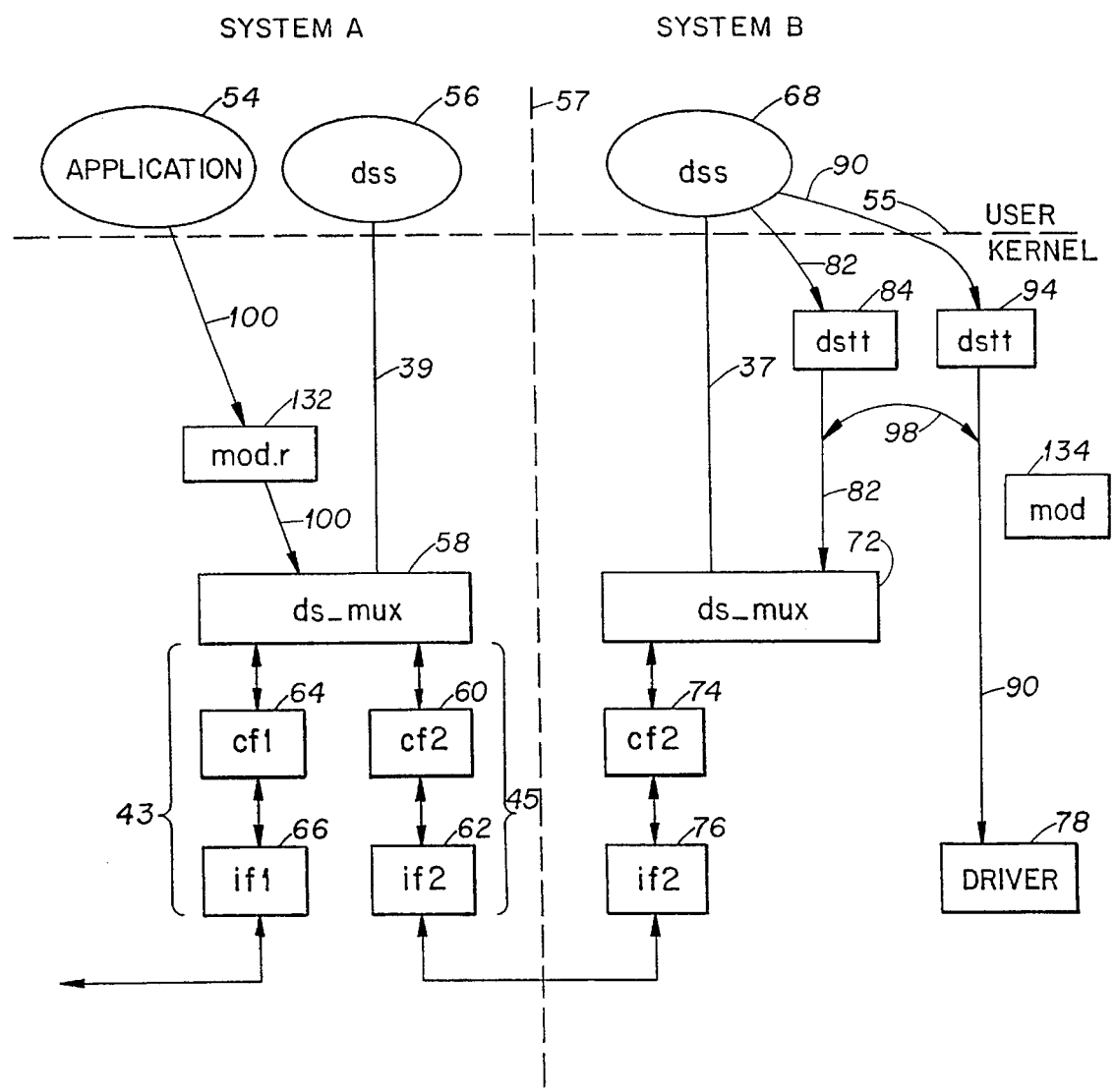
Figure 7C:
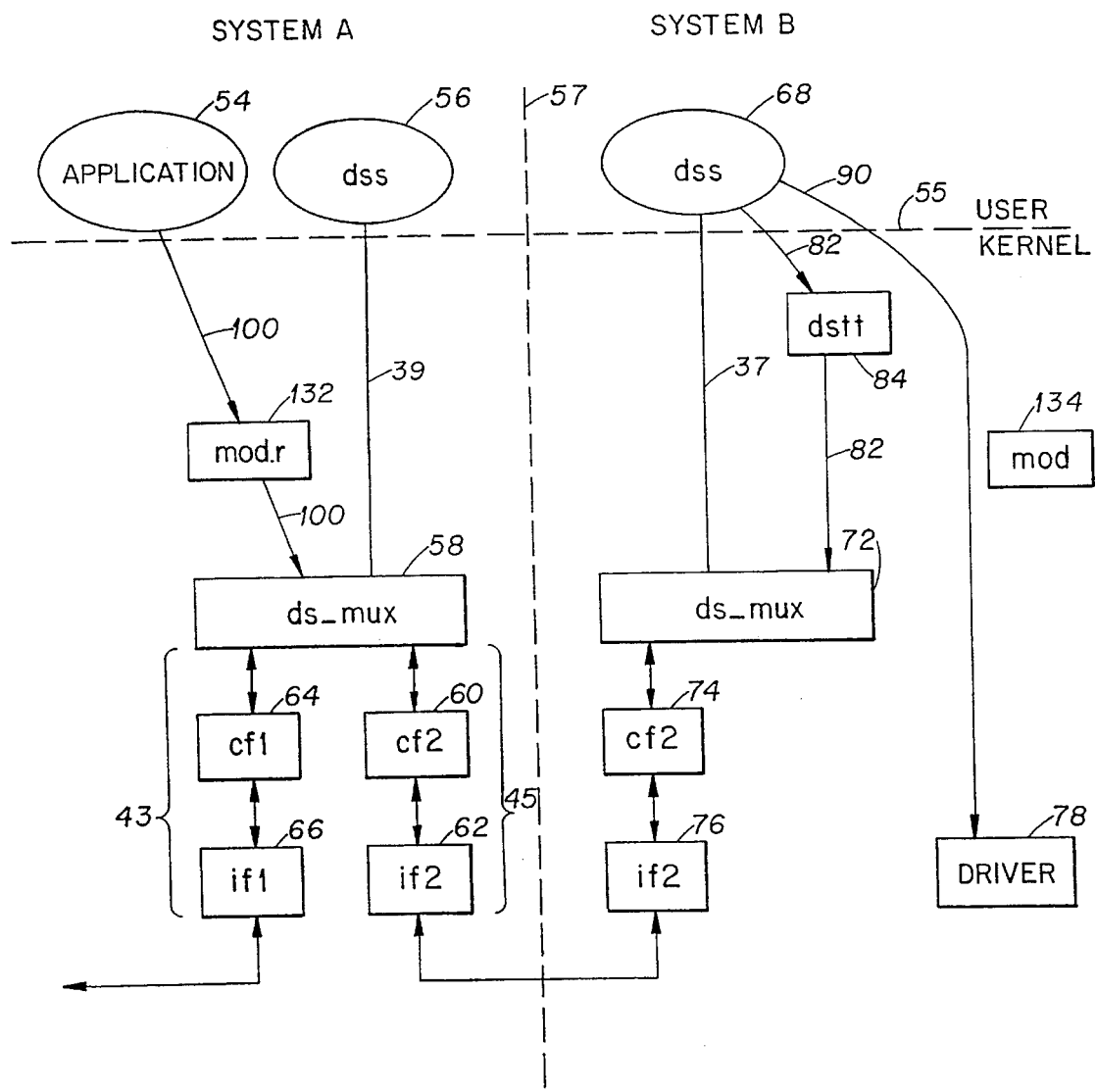
Figure 7D:
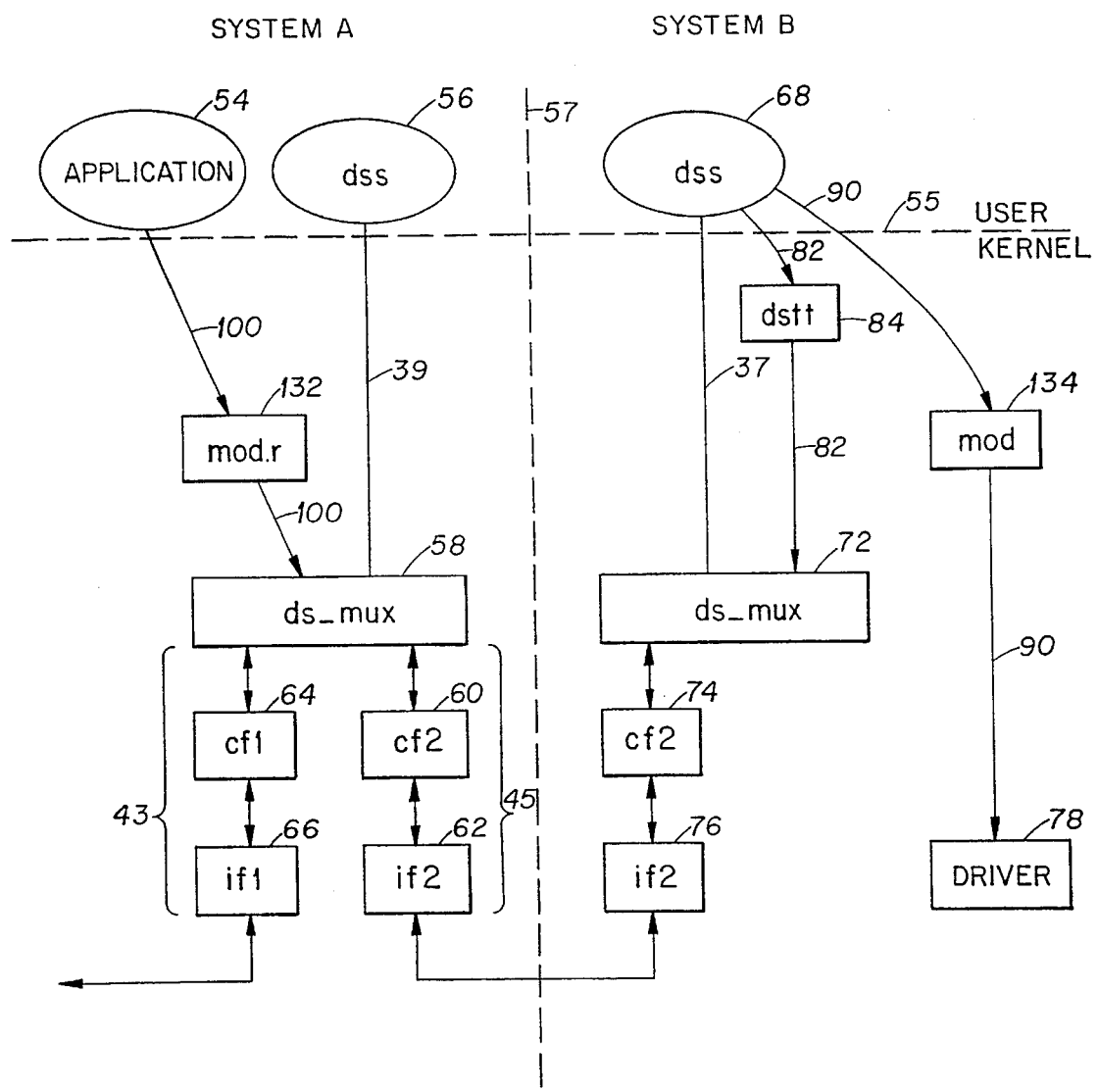
Figure 7E:
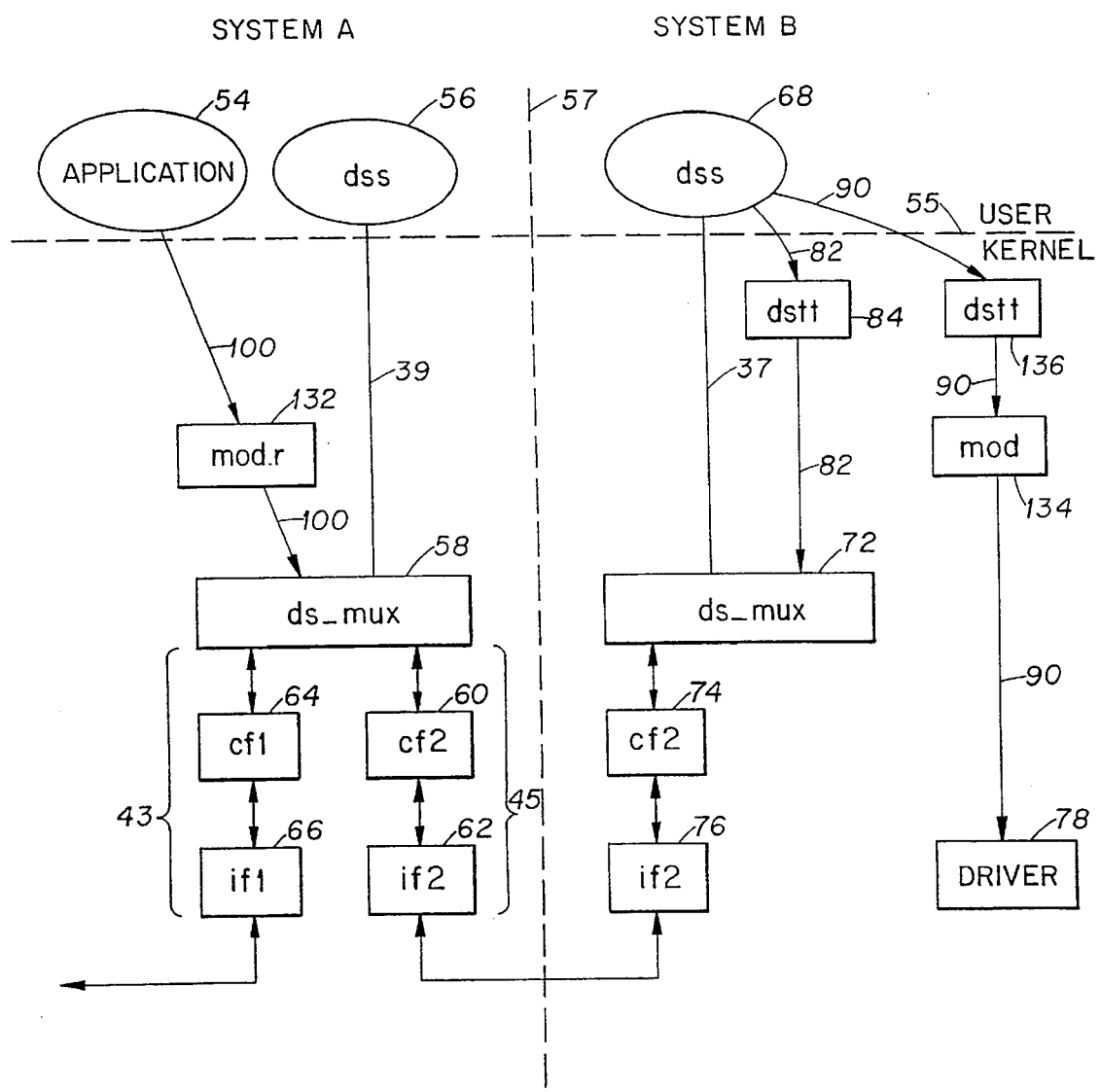
Figure 7F:
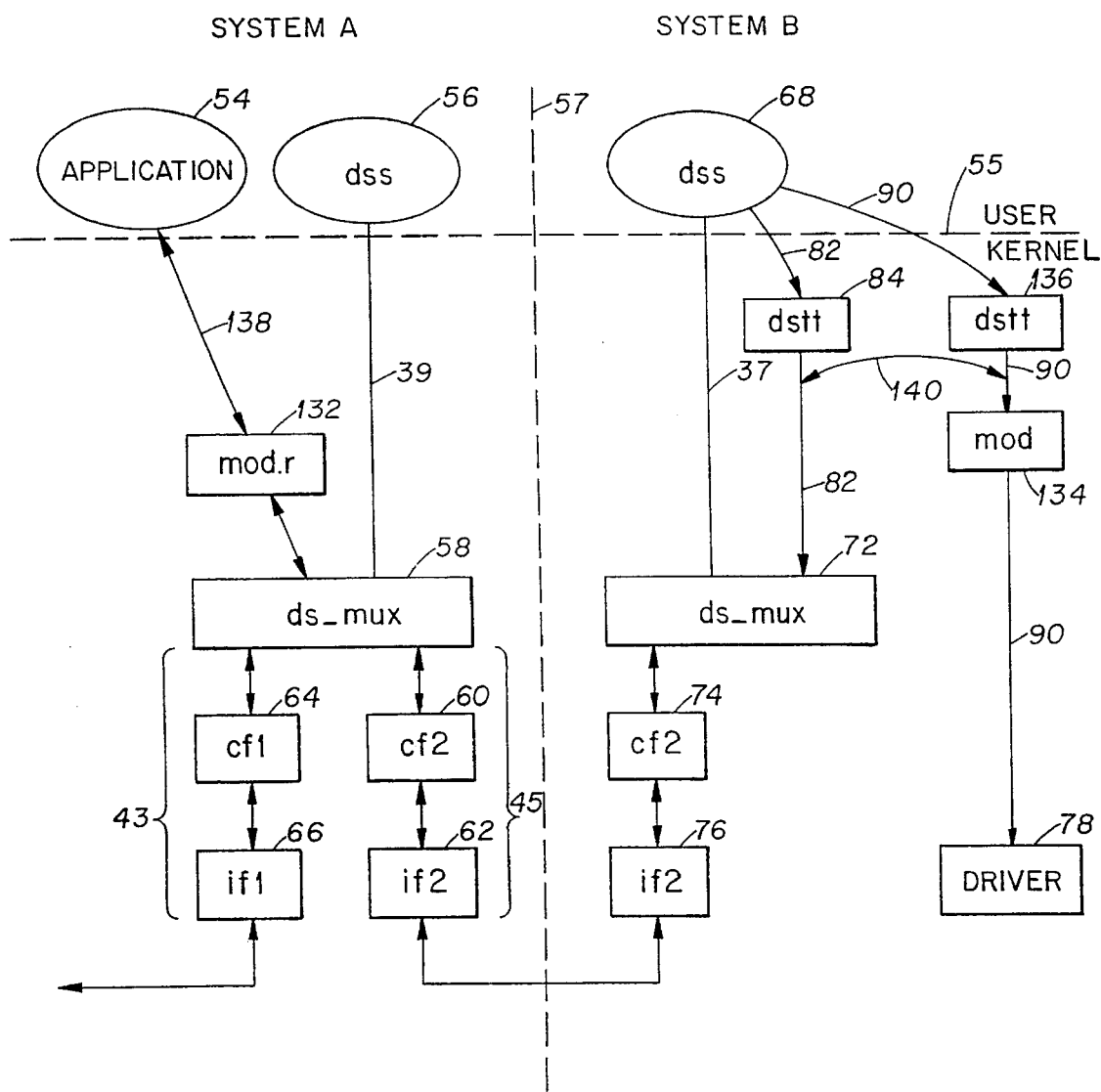
Figure 8:
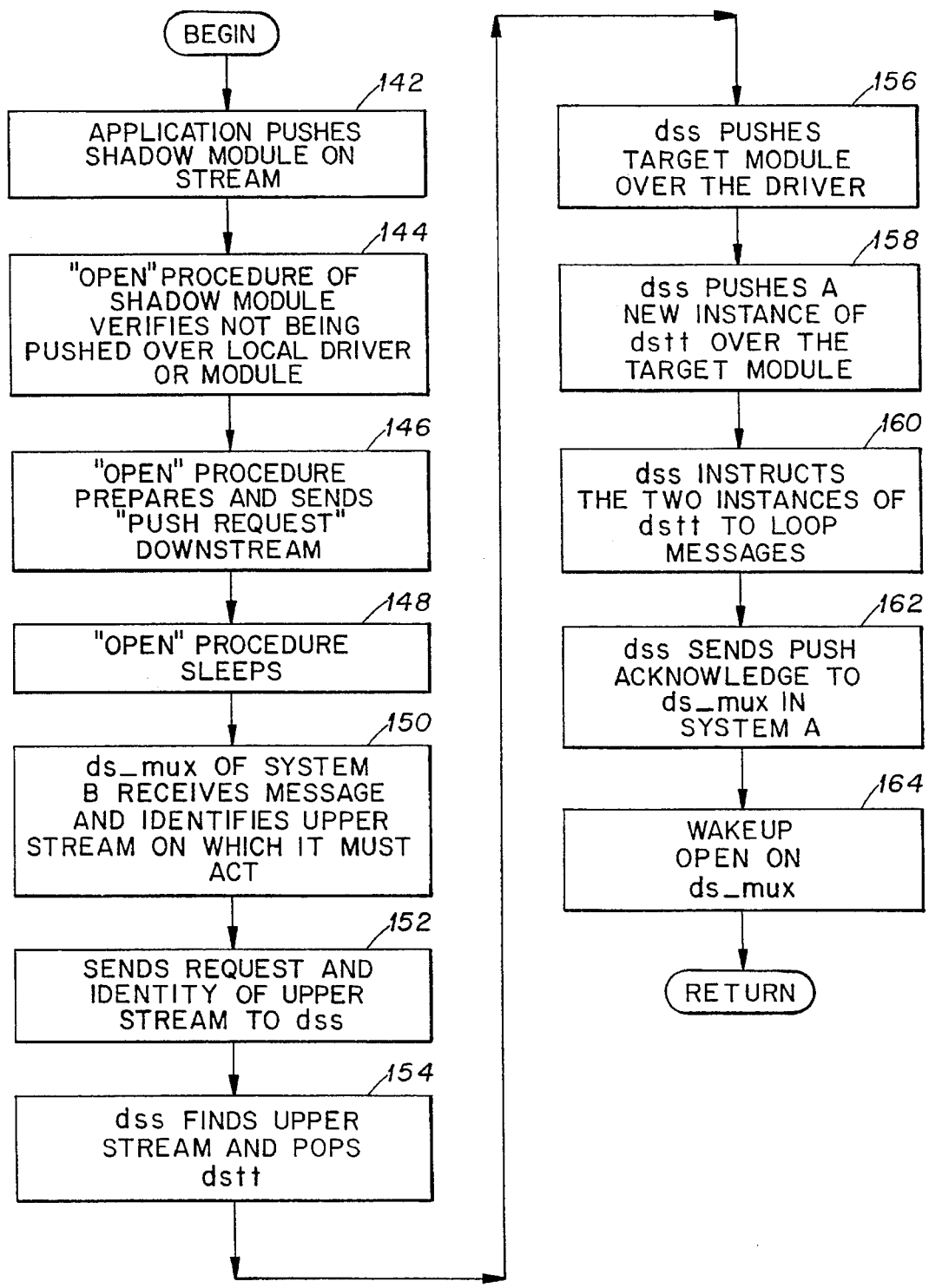
FIG. 8 is a flowchart of the steps involved in pushing a module onto a stream leading to a remote driver.

FIG. 8 shows a flowchart of steps involved in pushing the module 134 (FIG. 7a) on stream 90 in system B. The steps in this flowchart will be described with reference to FIGS. 7b–7f. Initially, the application 54 (FIG. 7b) pushes the distributed STREAMS shadow module 132 onto stream 100 that leads to ds_mux 58 (step 142 in FIG. 8) using an I_PUSH ioctl system call. The shadow module 132 (FIG. 7b) includes an "open" procedure that verifies that the module is not being pushed over a local driver or module (step 144 in FIG. 8). The shadow module 132 (FIG. 7b) then prepares a "push request" message containing the module name and sends the "push request" message downstream (step 146 in FIG. 8). The "open" procedure of the shadow module 132 (FIG. 7b) then sleeps (step 148 in FIG. 8). This "push request" message is conveyed to the ds_mux driver 72 in system B (FIG. 7b).

The ds_mux driver 72 identifies the upper stream on which the "push request" must act (step 150 in FIG. 8). In the present instance, the "push request" seeks to act on stream 90 (FIG. 7b). The ds mux module 72 sends the "push request" and the identity of the upper stream up the control stream 37 to dss 68 (step 152 in FIG. 8). Using the identity provided by the ds_mux 72 (FIG. 7c), dss 68 finds the stream leading to the driver 78 and pops the instance of the dstt 94 (FIG. 7b) off the stream (step 154 in FIG. 8). The dss 68 then pushes the target module 134 over the driver 78 as shown in FIG. 7d (step 156 in FIG. 8). Having pushed the module 134 (FIG. 7d) over the driver 78, the dss 68 in system B then pushes a new instance 136 of dstt over the target module as shown in FIG. 7e (step 158 in FIG. 8).

Given that instances 134 and 136 (FIG. 7f) of the dstt module are now in place, dss 68 on system B instructs the two instances 84 and 136 of the dstt module to cooperate in looping messages sent up one stream down another (see link 140) (step 160 in FIG. 8). The dss 68 (FIG. 7f) sends a "push acknowledge" message down the control stream 37 to the ds_mux 72 which, in turn, conveys the message to the ds_mux 58 on system A (step 162 in FIG. 8). The ds_mux 58 (FIG. 7f) on system A then issues a wake-up to its "open" procedure (step 164 in FIG. 8) to allow completion of the "open" routine. Upon completion, the "open" routine returns control back to the application 54 (FIG. 7f).

Figure 9A:
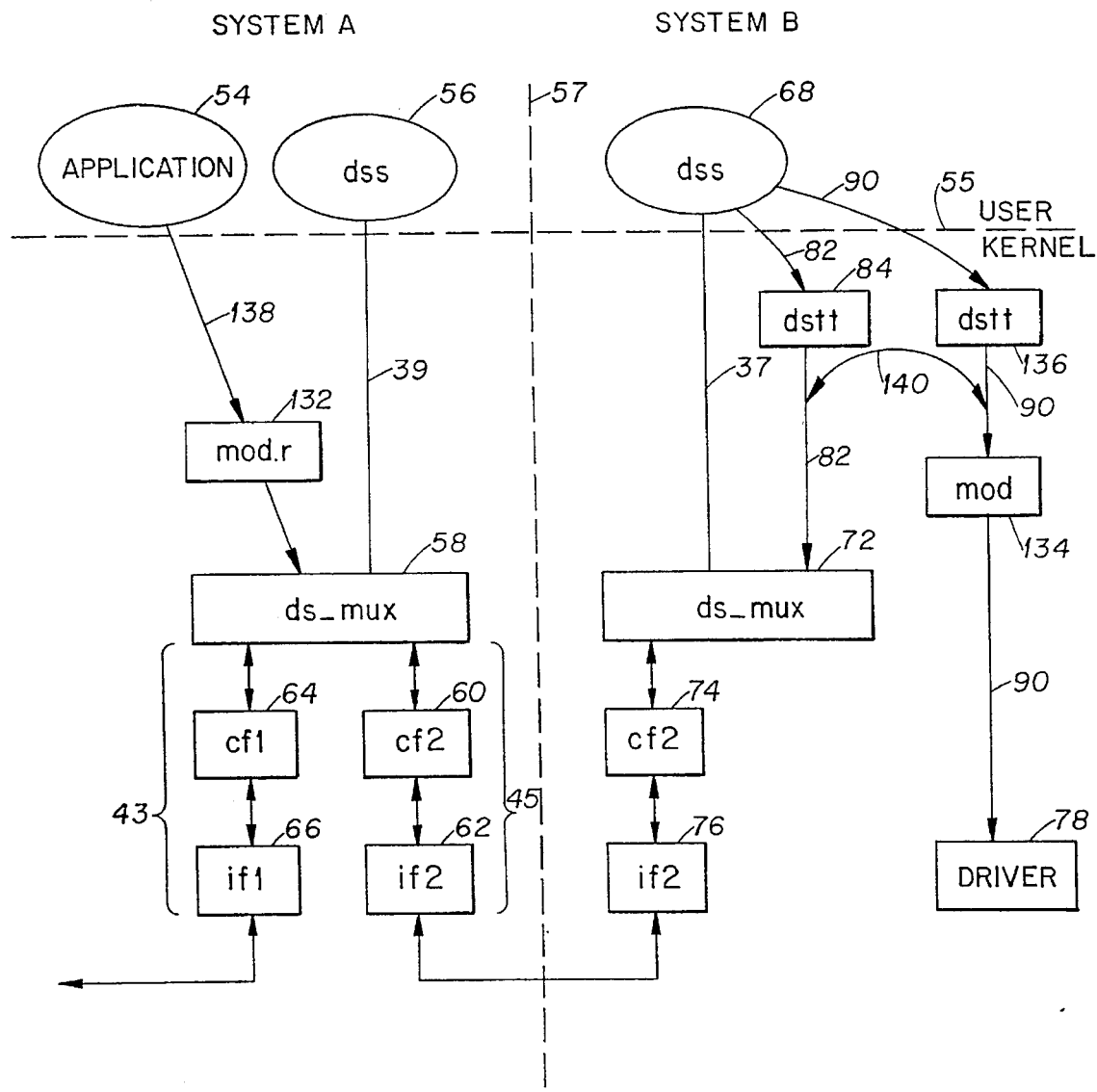
FIGS. 9a–9f depict the steps involved in popping a module off a stream leading to a remote driver.
Figure 9B:
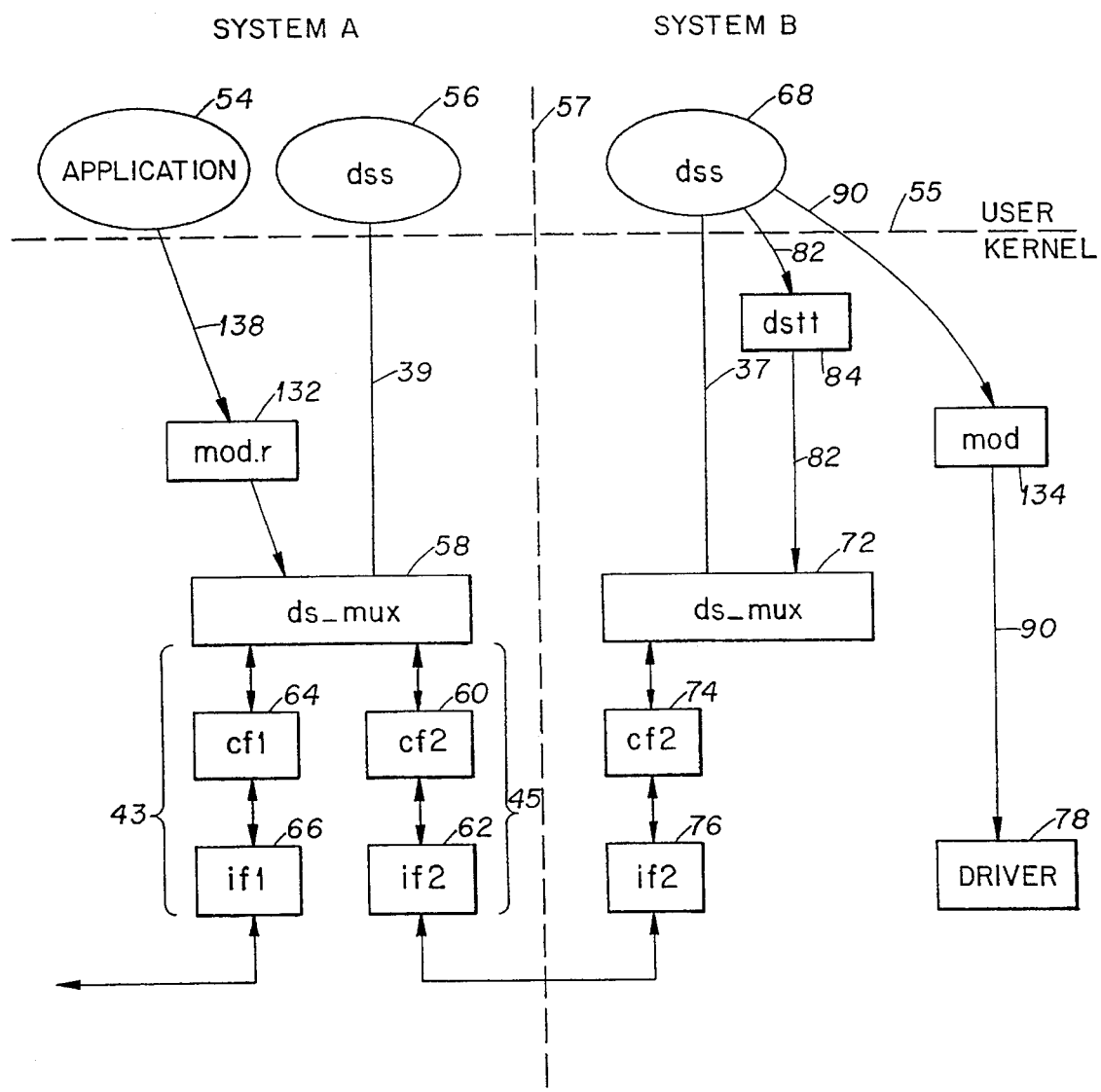
Figure 9C:
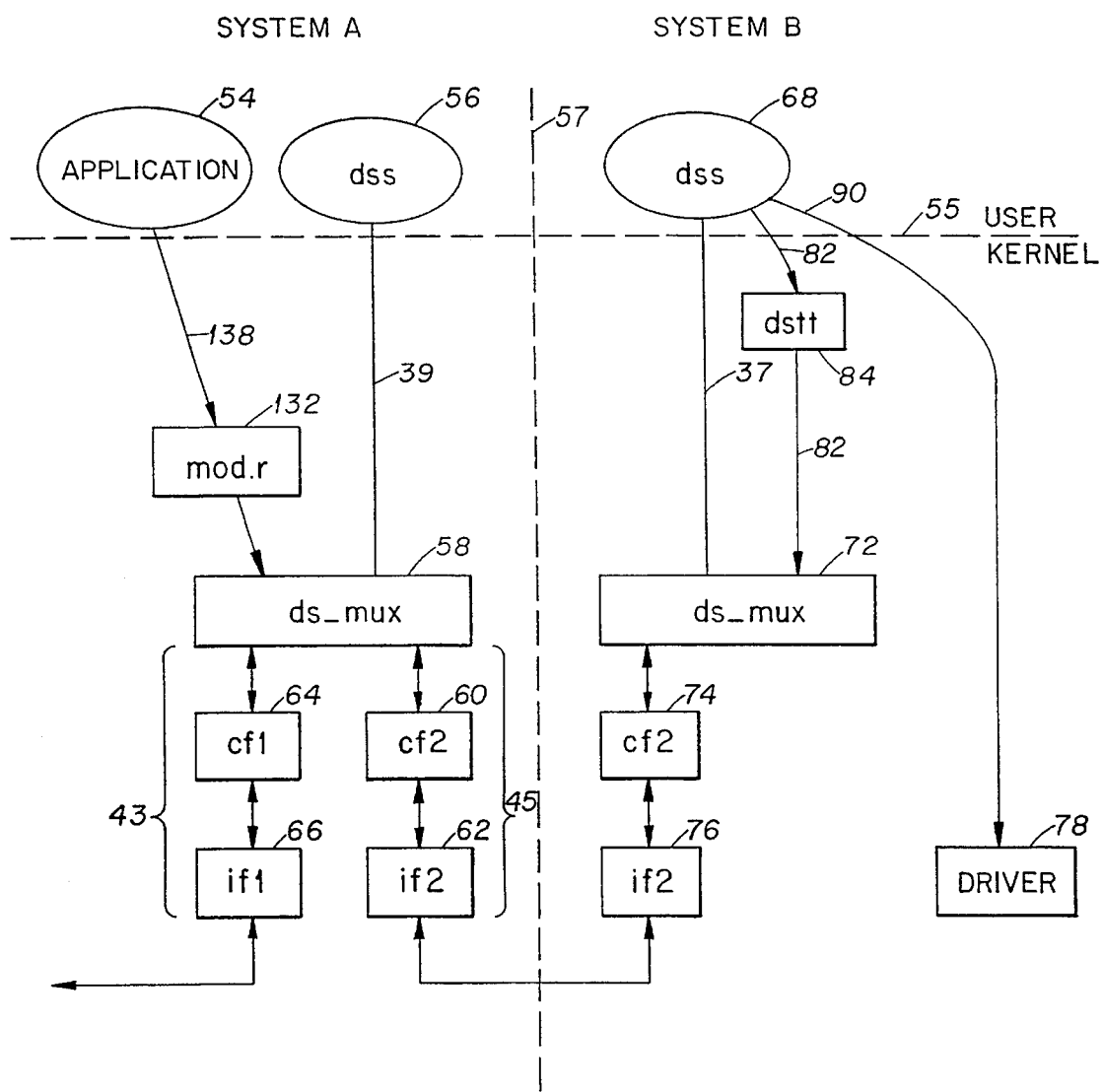
Figure 9D:
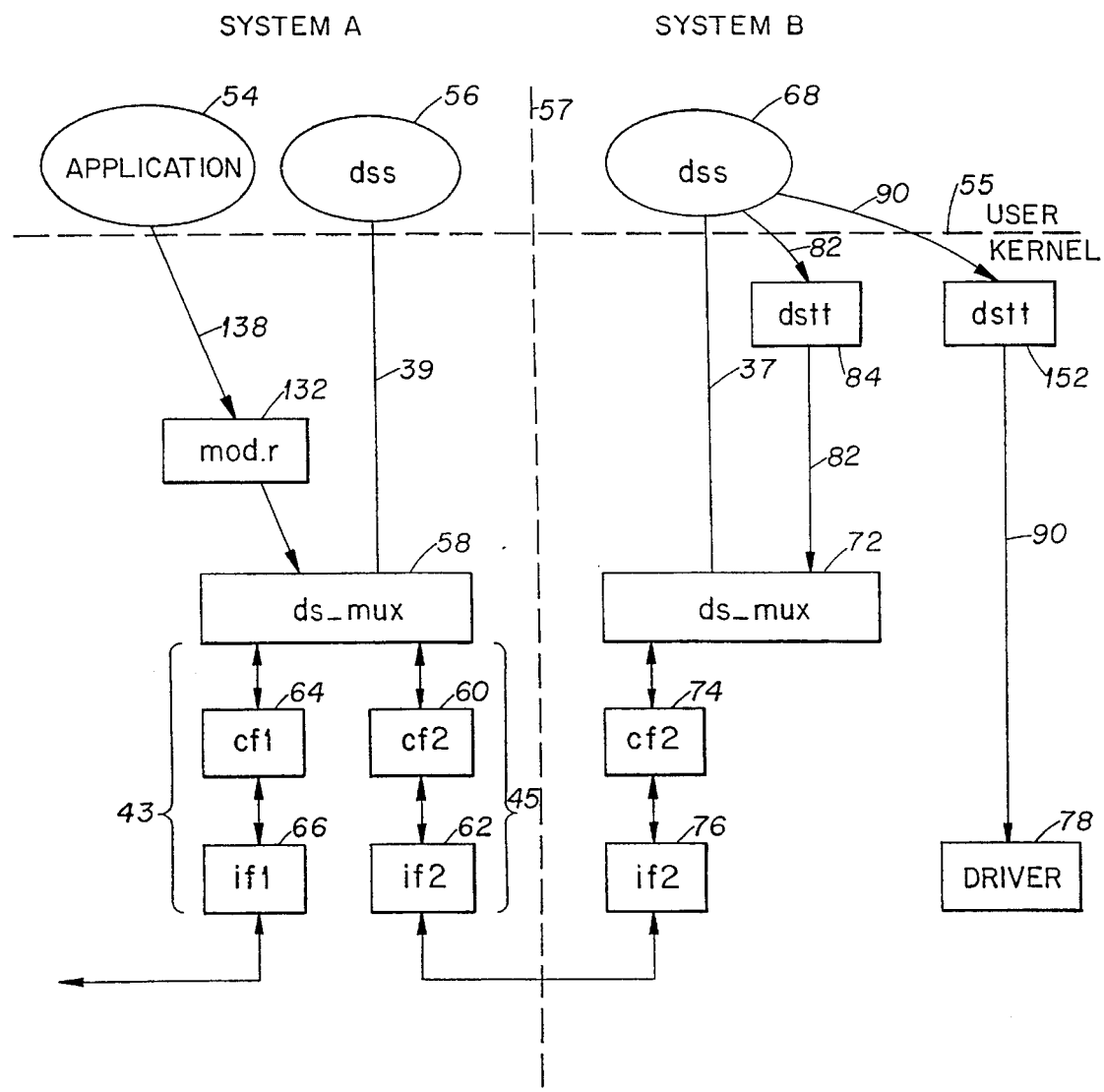
Figure 9E:
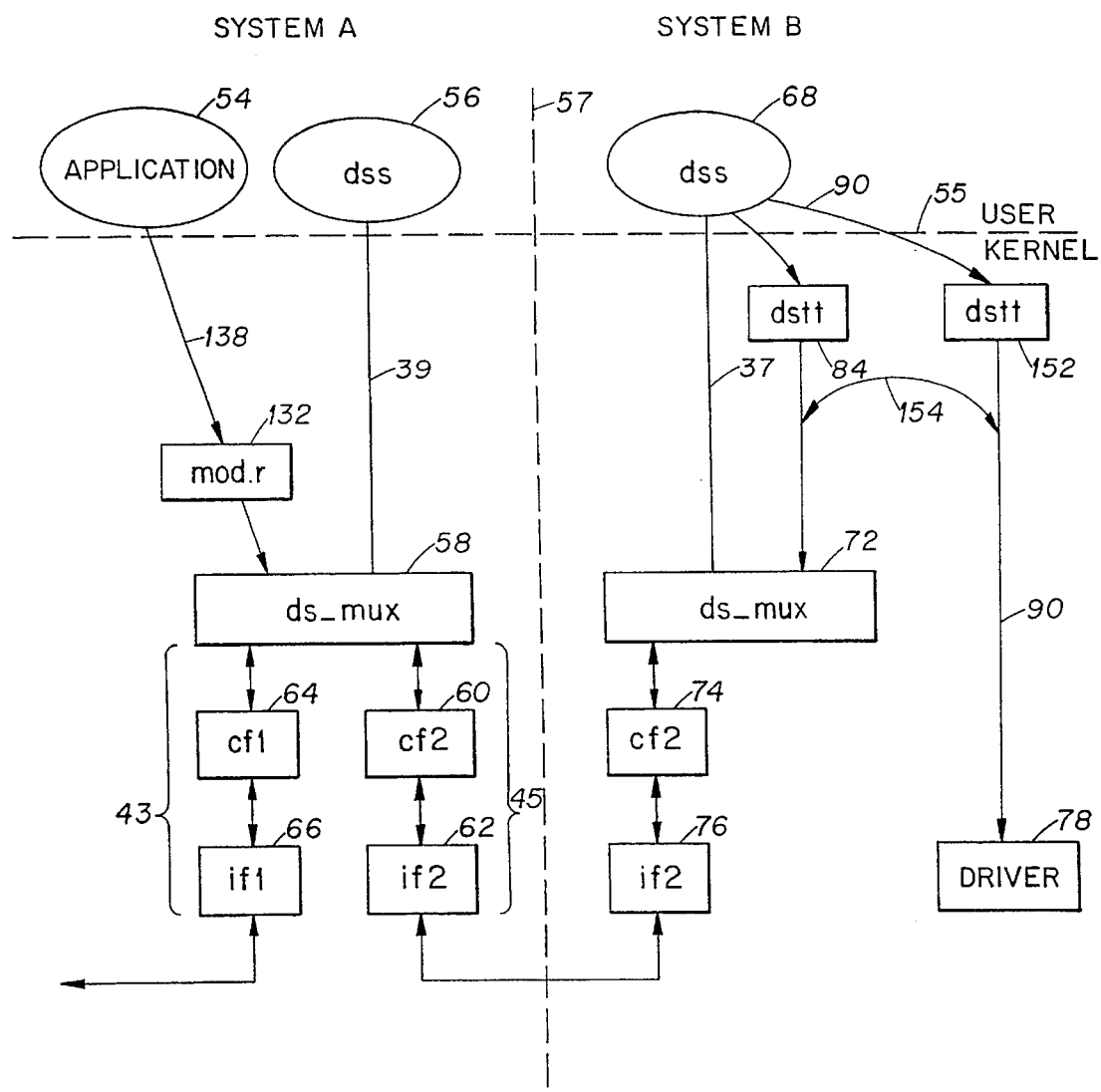
Figure 9F:
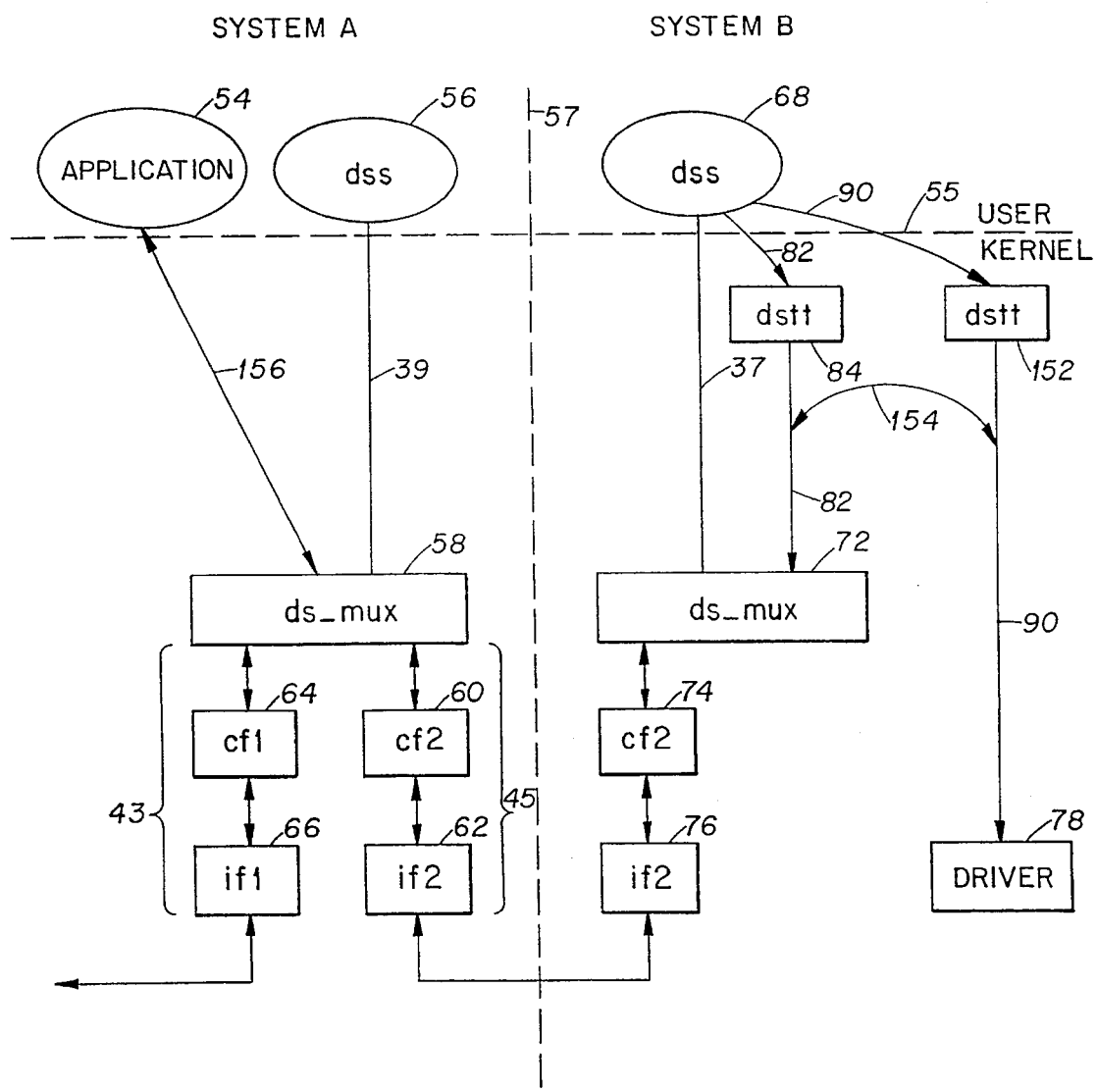
Figure 10:
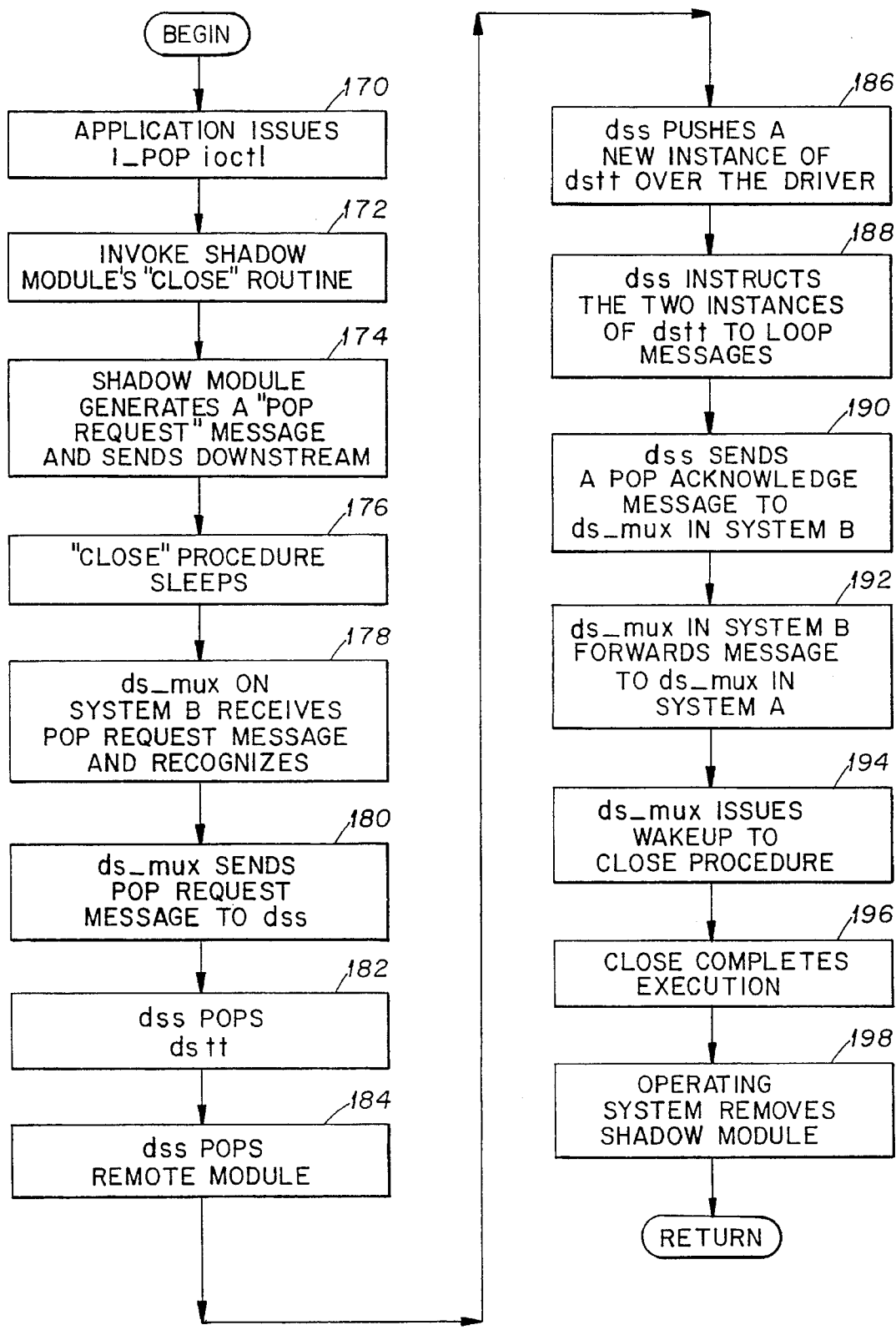
FIG. 10 is a flowchart of the steps involved in popping the module off a stream leading to a remote driver.

System A may then use the module that is present on system B. Once the application on system A has completed its use of the module, it may wish to pop the module. FIG. 10 provides a flowchart of the steps involved in popping the module. These steps will described below with reference to FIGS. 9a–9f. Initially, the application 54 on system A issues an I POP ioctl system call (step 170 in FIG. 10). This system call invokes the "close" procedure (step 172 in FIG. 10) of the shadow module 132 (FIG. 9a). The shadow module 132 generates a distributed STREAMS "pop request" message and sends this message downstream (step 174 in FIG. 10).

The shadow module "close" routine then sleeps (step 176 in FIG. 10). The "pop request" message is conveyed to the ds_mux 72 (FIG. 9a) on system B. The ds_mux 72 recognizes the message (step 178 in FIG. 10) and forwards the message up the control stream 37 (FIG. 9a) to dss 68 (step 180 in FIG. 10).

In response to the pop request, dss 68 (FIG. 9b) pops the instance 136 (FIG. 9a) of the dstt module (FIG. 9a) that was previously on the stream 90 (step 182 in FIG. 10). The dss 68 (FIG. 9c) makes a second I_POP ioctl system call, causing the popping of the remote module 134 (FIG. 9b) from stream 90 (step 184 in FIG. 10). The dss 68 (FIG. 9d) next pushes a new instance 152 of the dstt module over the driver 78 (step 186 in FIG. 10).

The dss 68 (FIG. 9e) instructs the two instances 84 and 152 of the dstt module to loop streams message sent up one stream down the other stream (step 188 in FIG. 10). The dss module 68 then sends a "pop acknowledge" message down the control stream 37 to ds_mux 72 (step 190 in FIG. 10). The distributed STREAMS multiplexer 72 (FIG. 9e) on system B forwards the "pop acknowledge" message to the ds_mux 58 on system A (step 192 in FIG. 10). In response to receiving the "pop acknowledge" message, the ds_mux 58 (FIG. 9e) wakes up the "close" procedure (step 194 in FIG. 10). The "close" procedure thus completes execution (step 196). The operating system automatically then removes the shadow module 132 from the stream as shown in FIG. 9f (step 198 in FIG. 10). The application 54 (FIG. 9f) may then continue to use the remote driver 78 without the remote module 124.

Figure 11A:
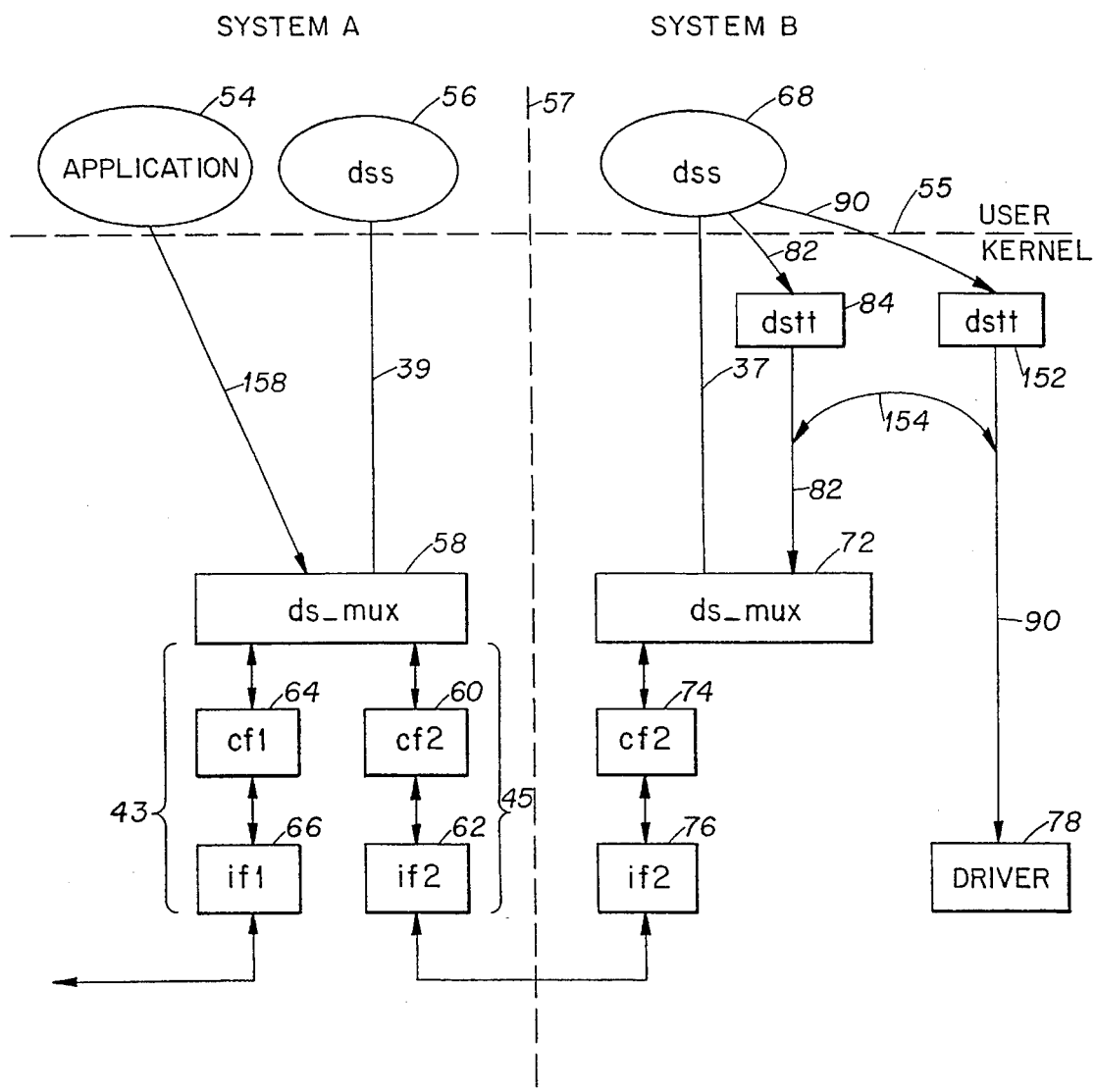
FIGS. 11a–11d depict the steps involved in closing a remote driver.
Figure 11B:
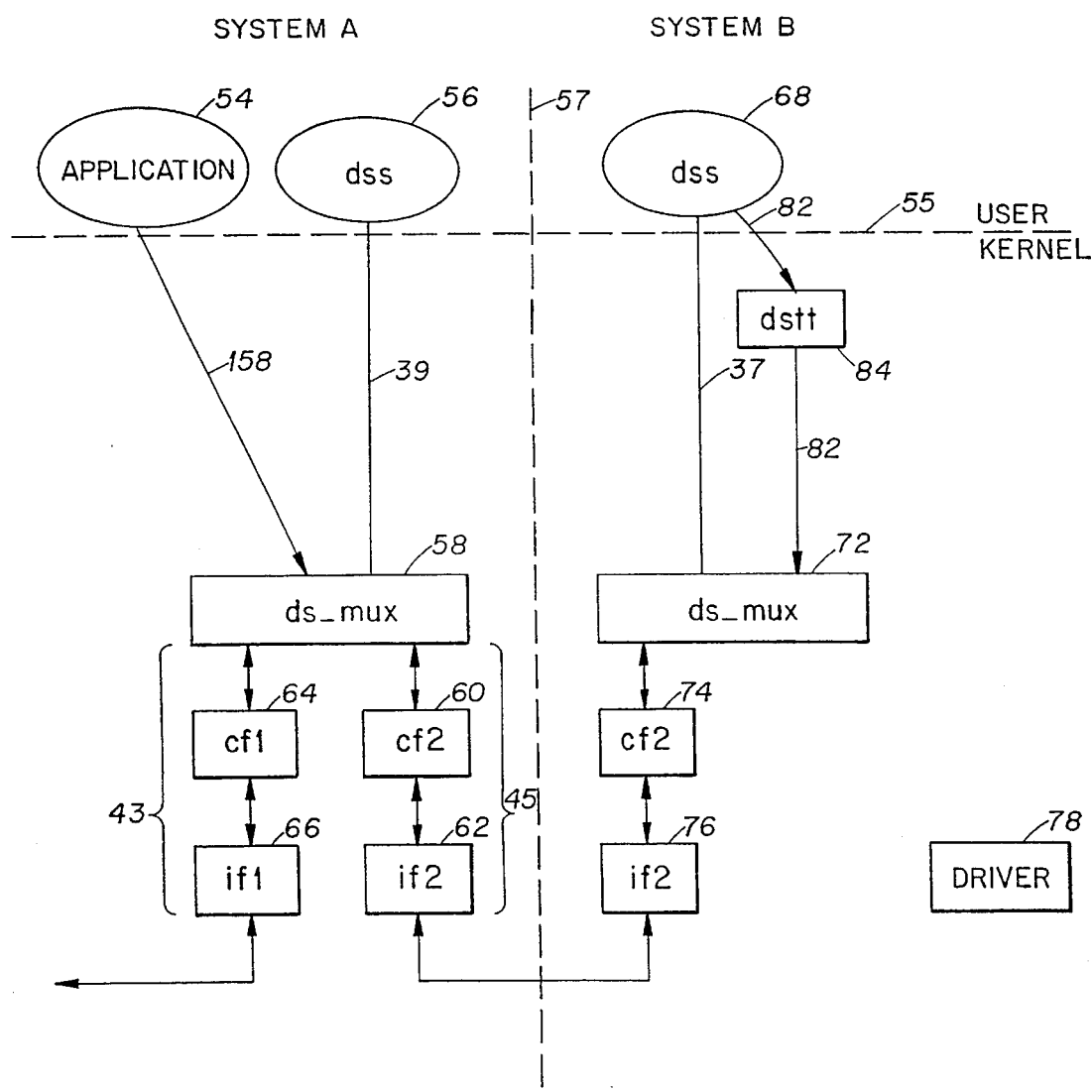
Figure 11C:
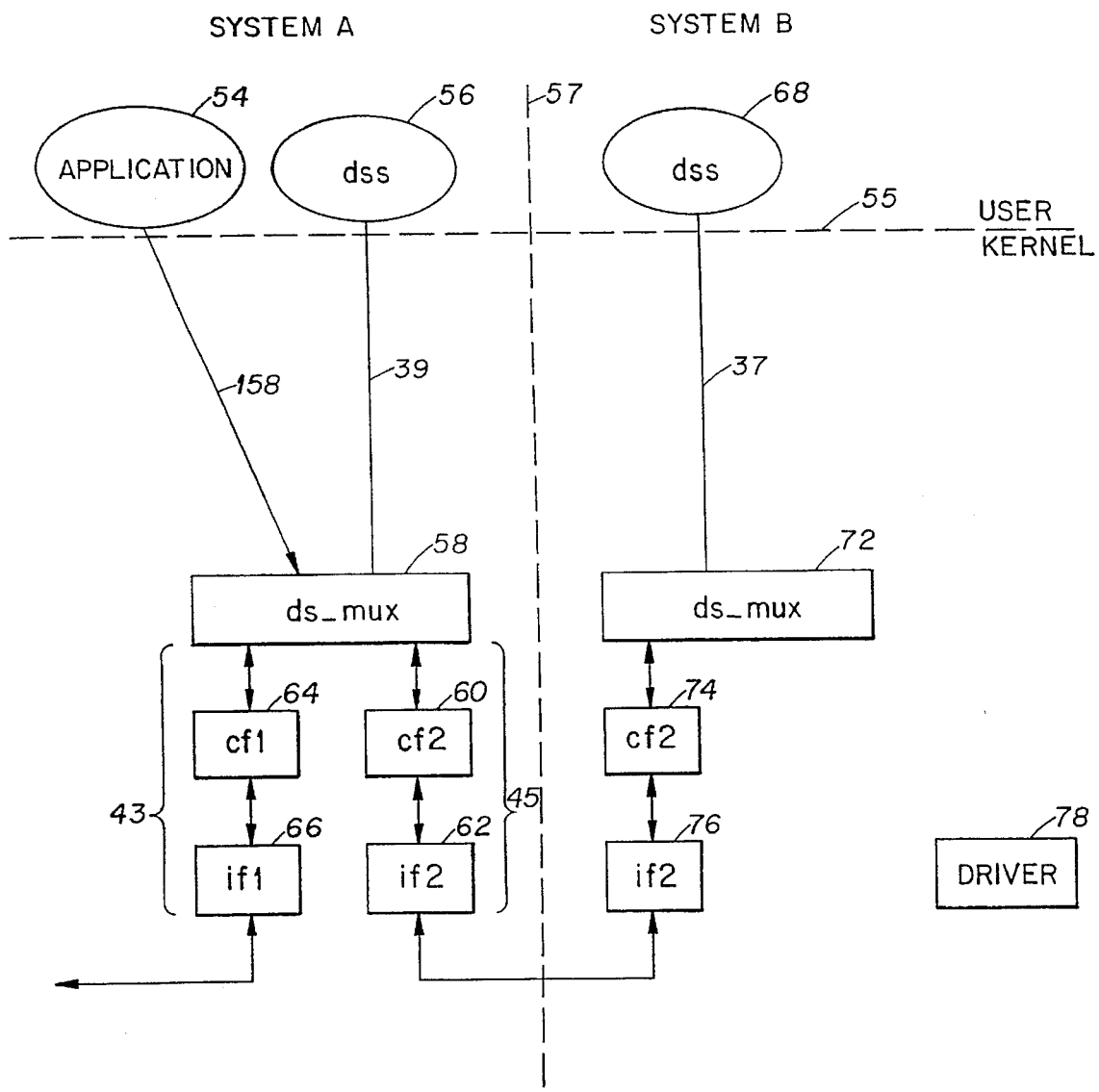
Figure 11D:
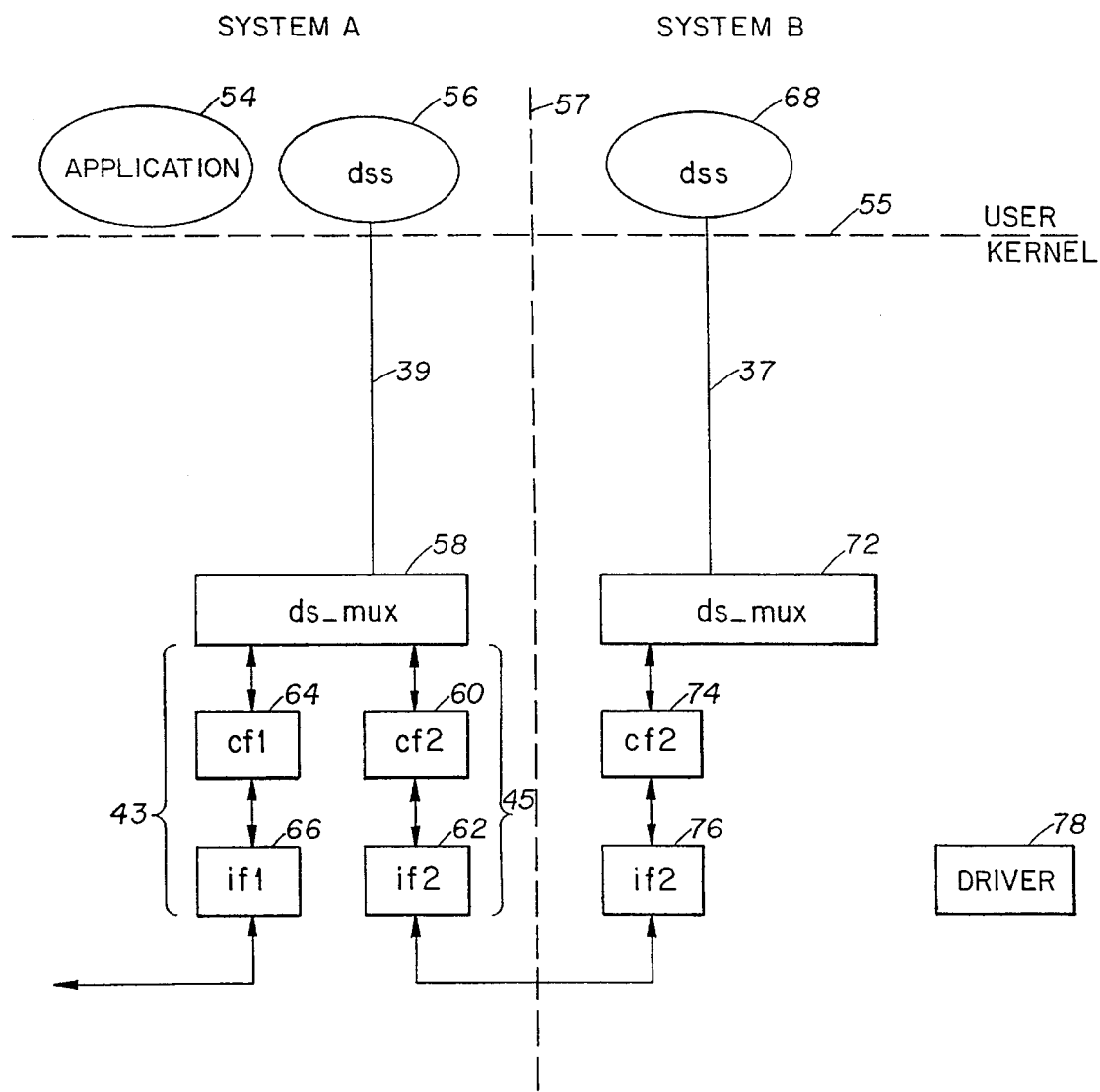
Figure 12:
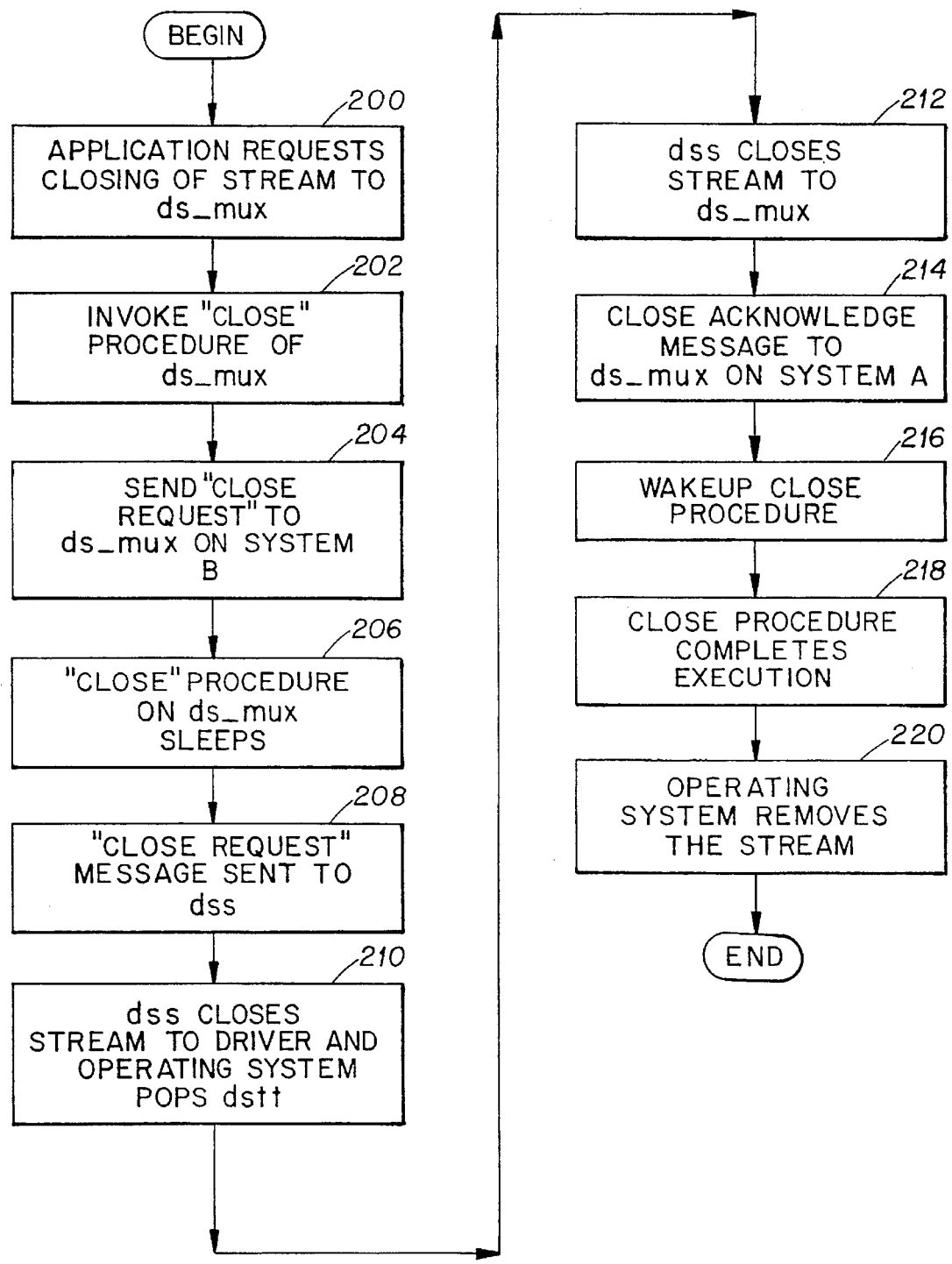
FIG. 12 is a flowchart of the steps involved in closing a remote driver.

Once the application 54 (FIG. 11a) of system A has completed its use of the remote driver 78, the application performs the steps shown in FIG. 12 to close the stream 90 (FIG. 11a) leading to the driver. These steps are described below with reference to FIGS. 11a–11d. The first step performed by the application 54 (FIG. 11a) on system A is to close the stream 158 leading to the ds_mux 58 in system A (step 200 in FIG. 12). The request to close the stream causes the invocation of the ds_mux 58 "close" procedure (step 202). The "close" procedure generates a distributed STREAMS "close request" message and sends the message down the appropriate lower stream by which it is conveyed to the ds_mux 72 (FIG. 11a) on system B (step 204 in FIG. 12). The ds_mux 58 (FIG. 11a) "close" routine then sleeps (step 206 in FIG. 12). The ds_mux 72 on system B recognizes the "close request" message and sends the message up the control stream 37 to dss 68 (FIG. 11a) on system B (step 208 in FIG. 12).

Upon receiving the close request, dss 68 (FIG. 11b) closes the stream leading to the driver 78, and the operating system pops the instance 152 of the dstt module (FIG. 11a) that is on stream 90 (step 210 in FIG. 12). The dss 68 (FIG. 11c) then closes the secondary stream leading to ds_mux 72 (step 212 in FIG. 12). The dss 68 then sends a "close acknowledge" message down the control stream 37 to the ds_mux 72 which conveys the message through the ds_mux 72 onto system A (step 214 in FIG. 12).

ds_mux module 72 (FIG. 11c) then generates a wake-up call so as to allow the ds_mux "close" procedure to resume its execution (step 216 in FIG. 12). The ds_mux module 72 (FIG. 11d) hence completes the execution of its "close" procedure (step 218 in FIG. 12). Lastly, the operating system of system A removes the stream from the application (step 220 in FIG. 12) and the application then may resume processing.

While the present invention has been shown with reference to a preferred embodiment, those skilled in the art know of various changes in form and function that may be made without departing from the spirit and scope of the invention as defined in the appended claims.

I claim:

1. An apparatus for providing a distributed stream leading from an application on a first system to at least one target driver on a second system, wherein the first system and the second system each have an operating system that provides a stream facility for providing a stream comprising a data path between a user process and an interface within a kernel of the operating system, the apparatus comprising:

means for opening a file node on the first system to open a first driver on the first system corresponding to the at least one target driver on the second system and create a first new stream on the first system;

means for opening a first new stream on the second system;

means for pushing a first instance of a distributed streams twist-tie module over the first new stream on the second system, that leads to a first driver on the second system, the first instance of the distributed streams twist-tie module including means for receiving messages directed to a user process on the second system and for routing the messages to the first driver on the second system;

means for opening the at least one target driver on the second system to create a second new stream on the second system; and means for pushing a second instance of the distributed streams twist-tie module over the second new stream on the second system to the at least one target driver, the second instance of the distributed streams twist-tie module including means for receiving messages directed to a user process on the second system and for routing the messages to the at least one target driver on the second system.

2. The apparatus of claim 1, further including:

means for instructing the first instance and the second instance of the distributed streams twist-tie module to cooperate in looping messages; and means for associating the first new stream on the second system with the file node on the first system.

3. The apparatus of claim 1, further including:

means for pushing a distributed streams shadow module onto the first new stream on the first system, the distributed streams shadow module being for enabling a module to be pushed onto a stream;

means for determining that the distributed streams shadow module is being pushed over the first driver on the first system;

means for sending a push request to the second system;

means for determining the second instance of the distributed streams twist-tie module as a destination for the push request; and means for pushing a target module onto the second new stream on the second system.

4. The apparatus of claim 3, further including means for determining that the distributed streams shadow module is being pushed over another instance of the shadow module on the first system.

5. The apparatus of claim 3, further including means for popping the distributed streams twist-tie module from the second new stream on the second system.

6. The apparatus of claim 5, further including:

means for pushing a third instance of the distributed streams twist-tie module onto the second stream of the second system; and means for instructing the first instance and the third instance of the distributed streams twist-tie module to cooperate in looping messages.

7. The apparatus of claim 6, further including:

means for generating a pop request message on the first system;

means for receiving the pop request message on the second system;

means for popping the second instance of the distributed streams twist-tie module;

means for popping the at least one target module on the second system;

means for pushing a fourth instance of the distributed streams twist-tie module onto the second new stream in the second system;

means for instructing the first instance and the fourth instance of the distributed streams twist-tie module to cooperate in looping messages; and means for removing the shadow module from the first new stream of the first system.

8. The apparatus of claim 1, further including means for closing the distributed stream leading from the application on a first system to the at least one target driver on the second system.

9. A method for providing a distributed stream leading from an application on a first system to at least one target driver on a second system, wherein the first system and the second system each have an operating system that provides a stream facility for providing a stream comprising a data path between a user process and an interface within a kernel of the operating system, the method comprising the steps of:

opening a file node on the first system, that opens a first driver on the first system corresponding to the at least one target driver on the second system and creates a first new stream on the first system;

opening a first new stream on the second system;

pushing a first instance of a distributed streams twist-tie module over the first new stream on the second system, that leads to a first driver on the second system, the first instance of the distributed streams twist-tie module receiving messages directed to a user process on the second system and routing the messages to the first driver on the second system;

opening the at least one target driver on the second system, that creates a second new stream on the second system; and pushing a second instance of the distributed streams twist-tie module over the second new stream on the second system to the at least one target driver, the second instance of the distributed streams twist-tie module receiving messages directed to a user process on the second system and routing the messages to the at least one target driver on the second system.

10. The method of claim 9, further including the steps of:

instructing the first instance and the second instance of the distributed streams twist-tie module to cooperate in looping messages; and associating the first new stream on the second system with the file node on the first system.

11. The method of claim 9, wherein the step of opening a file node further includes the steps of:

mapping major and minor device numbers to a corresponding target driver of the at least one target driver on the second system;

generating an open request message on the first system;

sending the open request message from the first system to the second system;

receiving the open request message on the second system; and verifying that the first system is allowed to use the second system.

12. The method of claim 9, further including the steps of:

pushing a distributed streams shadow module onto the first new stream on the first system, the distributed streams shadow module being for enabling a module to be pushed onto a stream;

determining that the distributed streams shadow module is being pushed over the first driver on the first system;

sending a push request to the second system;

determining the second instance of the distributed streams twist-tie module as a destination for the push request; and pushing a target module onto the second new stream on the second system.

13. The method of claim 12, further including the step of determining that the distributed streams shadow module is being pushed over another instance of the shadow module on the first system.

14. The method of claim 12, further including a step, performed prior to the step of pushing a target module, of popping the distributed streams twist-tie module from the second new stream on the second system.

15. The method of claim 14, further including the steps, performed after the step of pushing a target module, of:

pushing a third instance of the distributed streams twist-tie module onto the second stream of the second system; and instructing the first instance and the third instance of the distributed streams twist-tie module to cooperate in looping messages.

16. The method of claim 15, further including the steps of:

generating a pop request message on the first system;

receiving the pop request message on the second system;

popping the second instance of the distributed streams twist-tie module;

popping the at least one target module on the second system;

pushing a fourth instance of the distributed streams twist-tie module onto the second new stream in the second system;

instructing the first instance and the fourth instance of the distributed streams twist-tie module to cooperate in looping messages; and removing the shadow module from the first new stream of the first system.

17. The method of claim 9, further including the step of closing the distributed stream leading from the application on a first system to the at least one target driver on the second system.

18. The method of claim 17, wherein the step of closing includes the steps of:

sending a close message from the first system to the second system;

closing the second new stream on the second system;

closing the first new stream on the second system; and closing the first stream on the first system.

* * * * *